US007225662B2

(12) United States Patent
Kamata

(10) Patent No.: US 7,225,662 B2
(45) Date of Patent: Jun. 5, 2007

(54) GEOPHONE CALIBRATION TECHNIQUE

(75) Inventor: Masahiro Kamata, Kawasaki (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/928,953

(22) Filed: Aug. 27, 2004

(65) Prior Publication Data

US 2006/0042352 A1 Mar. 2, 2006

(51) Int. Cl.
*G01V 13/00* (2006.01)
(52) U.S. Cl. .......................................... 73/1.85; 367/13
(58) Field of Classification Search ................ 73/1.85, 73/1.39, 1.41; 367/13
See application file for complete search history.

(56) References Cited

U.S. PATENT DOCUMENTS

| | | | | |
|---|---|---|---|---|
| 4,296,483 A | * | 10/1981 | Haill | 367/13 |
| 4,757,706 A | * | 7/1988 | Doggett | 73/1.85 |
| 5,644,067 A | | 7/1997 | Gabrielson | 73/1.39 |
| 5,774,415 A | * | 6/1998 | Hall et al. | 367/13 |
| 6,353,577 B1 | | 3/2002 | Orban et al. | 367/43 |

FOREIGN PATENT DOCUMENTS

WO    WO 00/55652    9/2000

OTHER PUBLICATIONS

"The Reciprocity Calibration of Piezoelectric Accelerometers," by Mark Harrison, A.O. Sykers, and Paul G. Marcotte, The Journal of the Accoustical Society of America, vol. 24, No. 4, Jul. 1952.

Frank van Kann, John Winterflood, "Simple method for absolute calibration of geophones, seismometers, and other inertial vibration sensors", Review of Scientific Instruments 76, 034501, Feb. 22, 2005 pp. 034501-1-034501-8, American Institute of Physics, 2005.

Lin Jin, "A reciprocity method for calibrating electro-mechanical transducers", Acta Seismologica Sinica, vol. 2, NO. 4, No. 1980, pp. 447-452, China, Abstract.

A. MacArthur, "Geophone frequency calibration and laser verification", Gelphysics, SEG, vol. 50, No. 1, Jan. 1985, pp. 49-55.

H-P. Liu, R.E. Warrick, "Effect of cable capacitance on In-situ borehole geophone calibration", Geophysics, SEG, vol. 63, No. 1, Jan. 1998, pp. 18-24.

* cited by examiner

*Primary Examiner*—Hezron Williams
*Assistant Examiner*—Tamiko Bellamy

(74) *Attorney, Agent, or Firm*—Karan Singh; Bill Batzer; Dale Gaudier

(57) ABSTRACT

Various techniques are described which may be used to facilitate and improve seismic exploration activities. For example, one aspect of the present invention is directed to a technique for enabling in-situ measurement of geophone response parameters. Another aspect of the present invention is directed to a technique for improving geophone calibration and for improving the accuracy of measurement of geophone response parameters. Yet another aspect of the present invention is directed to a technique for compensating geophone response output data in order to improve the accuracy of such data.

69 Claims, 14 Drawing Sheets

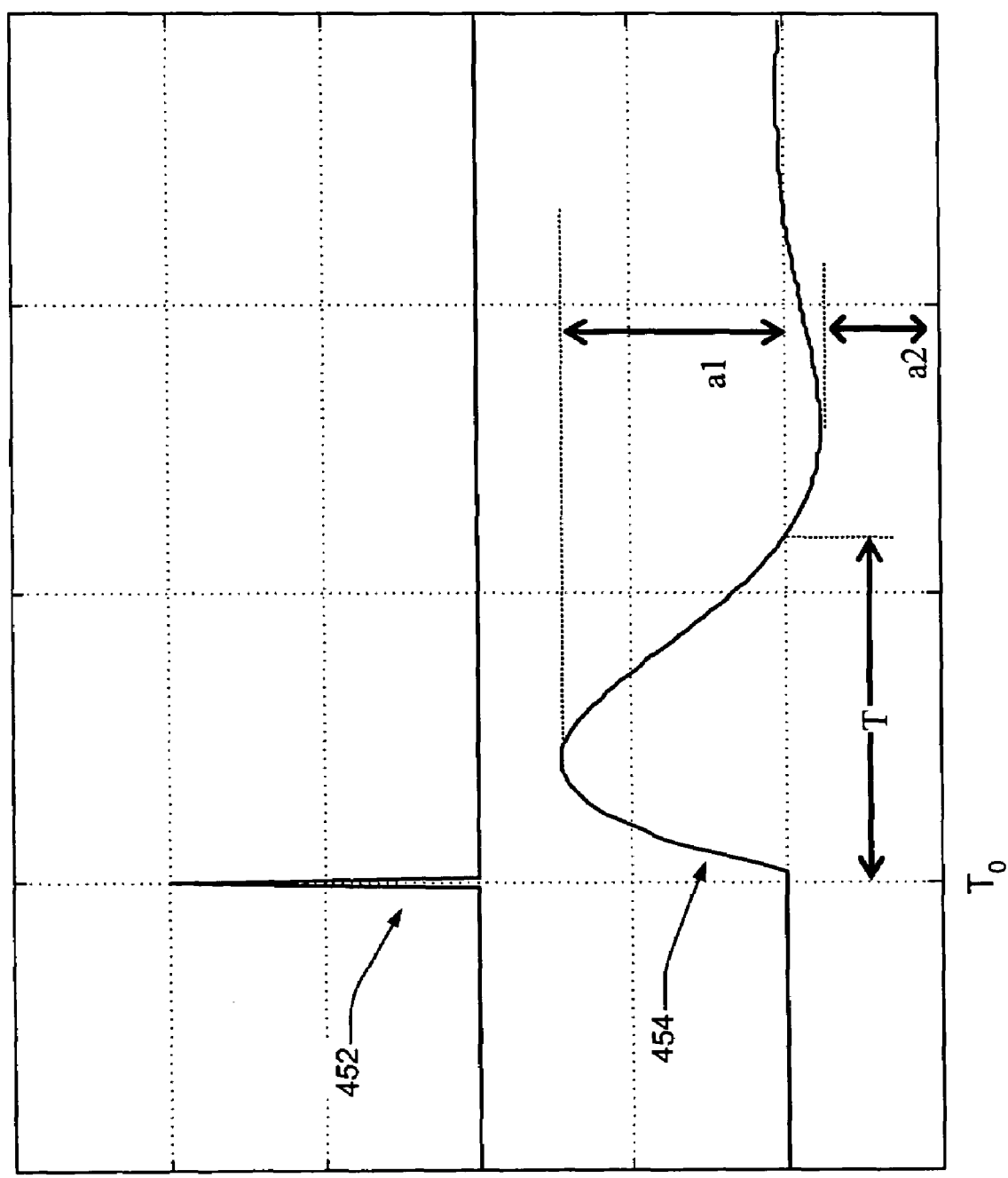

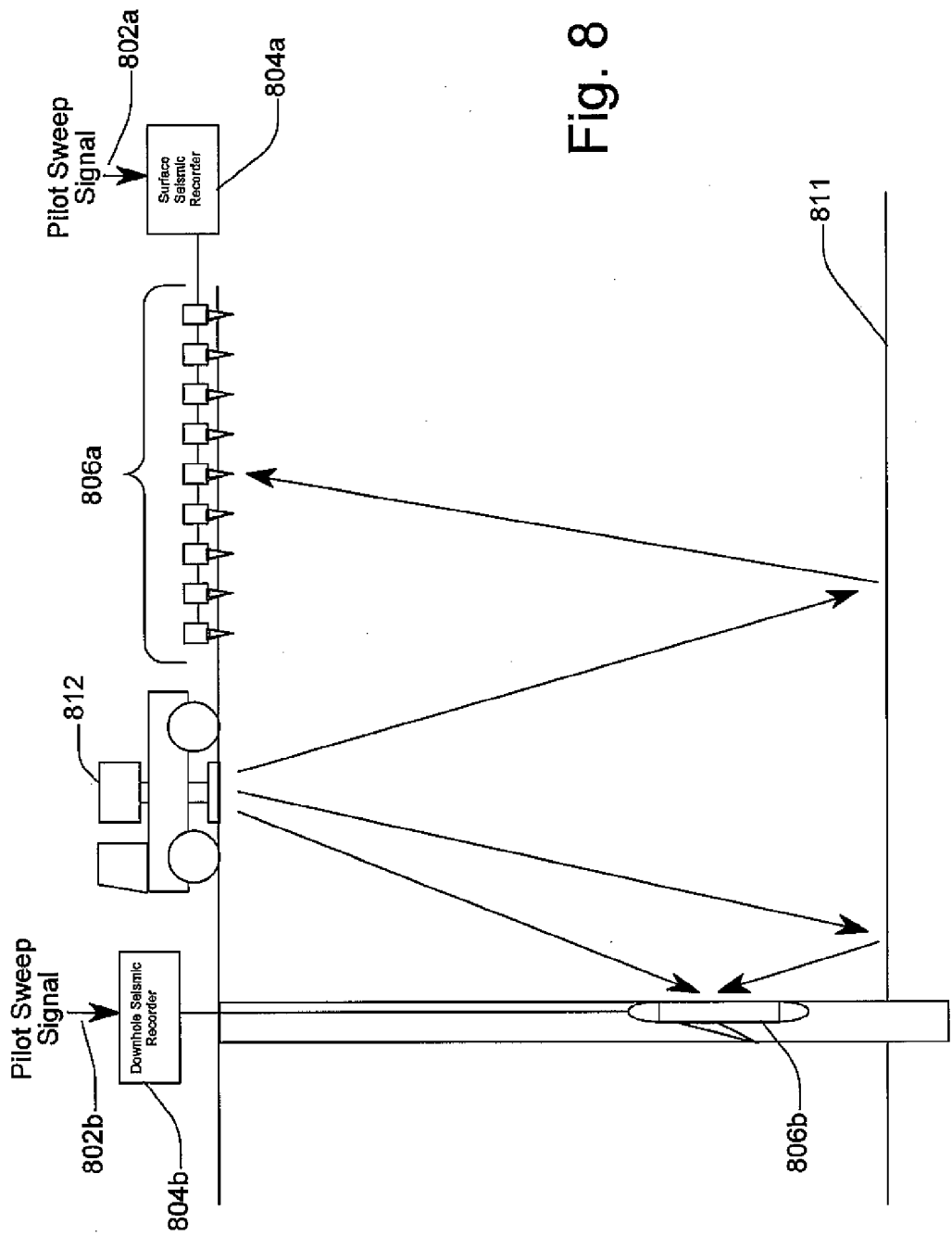

← 1600

← 1700

GEOPHONE CALIBRATION TECHNIQUE

BACKGROUND OF THE INVENTION

Field of the Invention

The present invention relates to geophones, devices for sensing vibrations in earth formations. The invention may be applicable to other types of vibration transducers, either in sensing or transmitting operation.

BACKGROUND

In seismic exploration, the vibrations in the earth resulting from a source of seismic energy are sensed at discrete locations by sensors and the output of the sensors used to determine the nature of the underground formations. The source of seismic energy can be natural, such as earthquakes and other tectonic activity, subsidence, volcanic activity or the like, or man-made such as acoustic noise from surface or underground operations, or from deliberate operation of seismic sources at the surface or underground. Sensors fall into two main categories; hydrophones which sense the pressure field resulting from a seismic source, or geophones which sense vibration arising from a seismic source.

When the earth moves due to the seismic energy propagating either directly from the source or via an underground reflector, the geophone, which can be located at the earth's surface or on the wall of a borehole which penetrates the earth, moves in the direction of propagation of the energy. If the axis of the geophone is aligned with the direction of motion, however, the moving coils mounted on the springs inside the geophone stay in the same position causing relative motion of the coils with respect to the housing. When the coils move in the magnetic field, a voltage is induced in the coils which can be output as a signal. The response of a geophone is frequency dependent.

In order to ensure proper working operation of a geophone, it is preferable to have the geophone calibrated periodically or before each use. Typically, geophone manufacturers and vendors do not perform any calibrations on their geophone units before the units are sold to customers. Rather the manufacturers provide assurances that the specifications of geophone units are within specified tolerance ranges at a specific temperature such as room temperature. However, such tolerance guarantees are not a substitute for proper calibration of the geophone units. Consequently, many purchasers of geophone units perform their own calibration tests on the purchased geophone units before deploying such units in the field.

However, conventional geophone calibration tests are often inadequate for assuring the desired precision of the geophone measurements typically demanded for many of today's seismic exploration activities. Accordingly, it will be appreciated that there exists a desire to improve upon conventional geophone calibration tests in order to improve the accuracy of seismic exploration measurements.

SUMMARY OF THE INVENTION

Different embodiments of the present invention are directed to various methods, systems, and computer program products for calculating response parameters of a geophone configured for use in seismic exploration activities. At least one calibration test is performed on the geophone to determine values for a first portion of response parameters associated with the geophone. The first portion of response parameters may include, for example, open circuit sensitivity, damping factor, natural frequency, etc. Using information relating to the first portion of response parameters, a moving mass parameter value for the geophone may then be determined. According to one embodiment, the moving mass parameter value represents an amount of moving mass associated with the geophone.

Another aspect of the present invention is directed to a technique for modifying geophone response output information generated by a first geophone configured for use in seismic exploration activities. A transfer function for an ideal response of a second geophone is determined based upon information relating to a portion of response parameters associated with the second geophone. The portion of response parameters may include, for example, open circuit sensitivity, damping factor, natural frequency, etc. The geophone response output information generated by the first geophone may then be modified using the transfer function. According to a specific embodiment, another transfer function may be determined for the first geophone based upon information relating to a portion of response parameters associated with the first geophone. The geophone response output information generated by the first geophone may then be modified using the first and/or second transfer functions.

Yet another aspect of the present invention is directed to a technique for processing seismic exploration information generated from seismic exploration activities. A first portion of the seismic information includes geophone response output information generated by at least one geophone. A second portion of the seismic exploration information includes source signal information relating to at least one source signal used in performing the seismic exploration activities. A first portion of response parameter values associated with a first geophone is determined. In one embodiment, the first portion of response parameter values may be determined by performing at least one calibration test procedure on the geophone. Accuracy of the seismic exploration information may then be improved by modifying at least a portion of the seismic exploration information to compensate for one or more of the first portion of response parameter values.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIGS. 4A and 4B provide examples of an impulse calibration test technique for measuring geophone response properties.

FIG. 8 shows an example of various equipment configurations which may be used for vibroseis prospecting.

DETAILED DESCRIPTION OF THE PREFERRED EMBODIMENTS

As described in greater detail below, the present invention provides various techniques which may be used to facilitate and improve seismic exploration activities. For example, one aspect of the present invention is directed to a technique for enabling in-situ measurement of geophone response parameters. Another aspect of the present invention is directed to a technique for improving geophone calibration and for improving the accuracy of measurement of geophone response parameters. Yet another aspect of the present invention is directed to a technique for compensating geophone response output data in order to improve the accuracy of such data.

In order to gain a better understanding the various techniques and features described in this application, a brief description of geophone measurement techniques will now be described.

Figure 1:
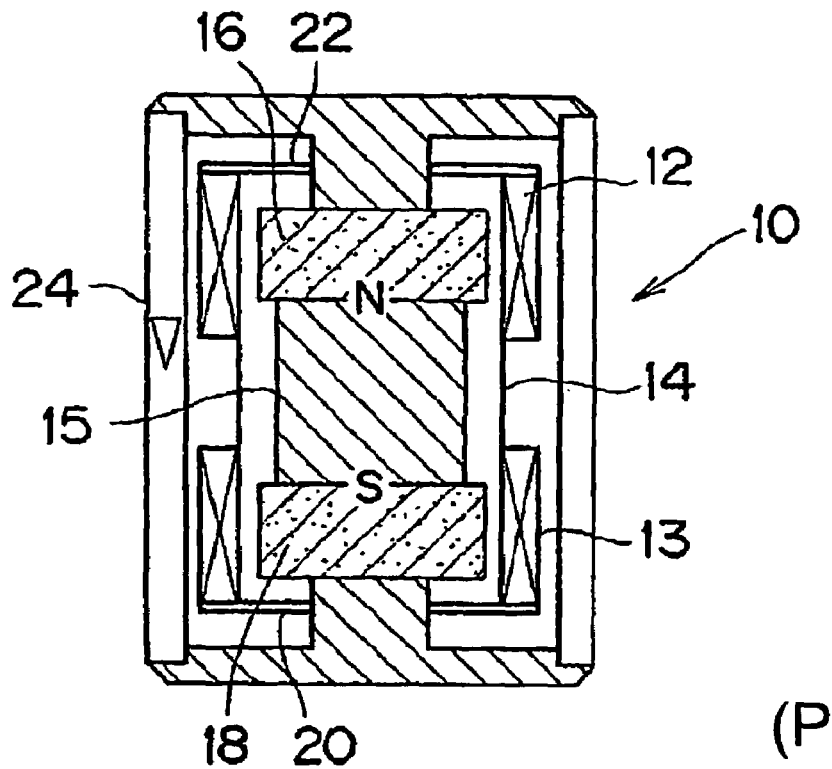
FIG. 1 shows an example of a conventional geophone 10.

A seismic survey measures seismic waves propagated through the earth to map structural images in the earth. Geophones are often used to detect seismic signals at various locations, such as, for example, down holes, ground surfaces and/or seabeds. An example of a conventional geophone is shown in FIG. 1. The geophone 10 of FIG. 1 includes moving coils 12, 13 mounted on a bobbin 14, a magnet 15, a pair of pole pieces 16, 18 with suspension springs 20, 22 and a housing 24 as shown in FIG. 1. The pole pieces 16, 18 and housing 24 are made of magnetically permeable material and form a magnetic field in which the moving coils 12, 13 are suspended. In the example of FIG. 1, the moving coils 12, 13, bobbin 14, and suspension springs 20, 22 collectively form the effective moving mass portion (m) of the geophone. As used in this application, the term "geophone" includes conventional-type geophones such as that illustrated in FIG. 1, as well as geophone accelerometer (GAC) devices which, for example, may be configured or designed to measure relatively wider acceleration ranges than conventional-type geophones.

Figure 2:
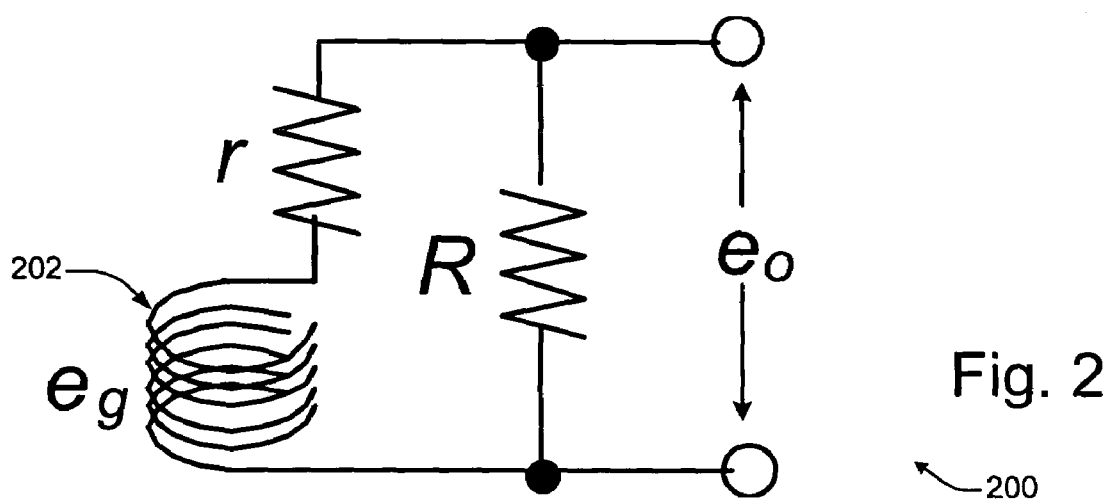
FIG. 2 shows a simplified electric circuit representation of the geophone of FIG. 1.

As shown in the embodiment of FIG. 1, the geophone 10 includes a moving mass of coil suspended in a magnetic flux by means of a spring or a pair of springs. The moving coil tries to stay in the same position while the housing of magnetic circuit is moved in response to external vibrations. FIG. 2 shows a simplified illustration of the geophone of FIG. 1. As illustrated in FIG. 2, a moving coil 202 generates a voltage $e_g$ in response to external vibration. The coil has an associated DC resistance r. The geophone output is shorted by R to provide a desired damping factor.

The geophone response is usually defined by its associated response properties, such as, for example, its natural frequency, damping factor, sensitivity and DC resistance of coil at room temperature. An example of traditional geophone response properties may be expressed by the following equations (1)–(6). For purposes of illustration, it is assumed that the geophone responds to sinusoidal earth accelerations. Thus, for example, the earth accelerations expressed by $$\alpha = a\sin(\omega t), \quad (1)$$

and the geophone response may be characterized by $$e_g = A(\omega)\sin(\omega t - \phi) \quad (2)$$

where $$A(\omega) = \frac{a\omega S_0 \left(\frac{\omega}{\omega_0}\right)^2}{\sqrt{\left\{1 - \left(\frac{\omega}{\omega_0}\right)^2\right\}^2 + \left(2\zeta\frac{\omega}{\omega_0}\right)^2}} \quad (3)$$

$$\tan\varphi = \frac{1 - \left(\frac{\omega}{\omega_0}\right)^2}{2\zeta\frac{\omega}{\omega_0}} \quad (4)$$

$$\zeta = \zeta_0 + \frac{S_0^2}{2(r+R)m\omega_0} \quad (5)$$

$$S = S_0 \frac{R}{r+R} \quad (6)$$

and where:

$e_g$ corresponds to generated voltage,
$S_0$ corresponds to open circuit sensitivity,
S corresponds to total sensitivity,
$\zeta_0$ corresponds to open circuit damping,
$\zeta$ corresponds to total damping,
$\omega_0$ corresponds to natural frequency=$2\pi f_0$,
r corresponds to DC resistance,
S corresponds to shunt resistance,
m corresponds to effective moving mass.

Vibroseis

In the acquisition of seismic data, seismic waves are used to interpret subsurface geological formations. One type of geophysical prospecting technique is generally known as "vibroseis" prospecting or simply vibroseis. Vibroseis employs a seismic vibroseis source used to generate a controlled wavetrain that propagates through the earth or water to be detected by seismic detectors (e.g., geophones).

FIG. 8 shows an example of various equipment configurations which may be used for vibroseis prospecting. As shown in the example of FIG. 8, surface acquisition of seismic data may be performed using a surface vibroseis source 812. Typically, surface vibroseis sources emit an energized wavefield over a selected time period known as sweep time. Seismic detectors (e.g., surface acquisition geophones 806a, downhole acquisition geophones 806b) detect earth movements during the sweep time period and during an additional time period commonly referred to as listen time. Typically, the energization takes the form of a sinusoidal wavefield of continuously varying frequency applied to the earth or a body of water during a sweep time lasting from about two to about 20 seconds or even more. For marine acquisition of seismic data, marine air gun seismic sources are generally used to generate the source signal, which typically includes a single pulse having multiple frequencies.

In seismic acquisitions which utilize a vibrator 812 such as that illustrated in FIG. 8, a pilot sweep signal drives the vibrator, causing the vibrator to inject acoustic signals into the earth in accordance with the pilot sweep signal. The geophones (806a, 806b) on the earth surface and/or downhole pick up signals propagated through the earth as shown in FIG. 8. The signals detected by the geophones are filtered by the geophone transfer function described by Equations (1) and (2) above. The recorded signals are then correlated with the pilot sweep signal(s) (802a, 802b) which are fed directly to the seismic recorders (e.g., surface seismic recorder 804a, downhole seismic recorder 804b).

Figure 9:
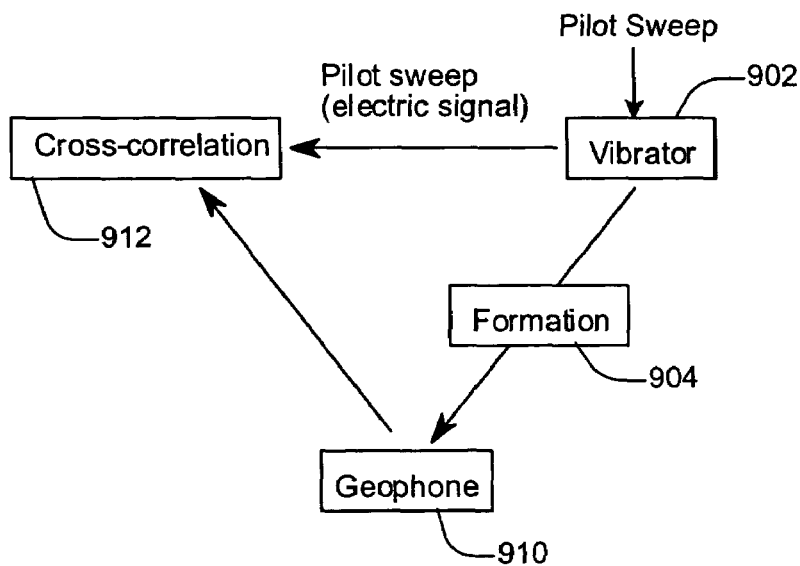
FIG. 9 shows an example of different signal paths which may flow between the various features and devices illustrated in FIG. 8.

FIG. 9 shows an example of different signal paths which may flow between the various features and devices illustrated in FIG. 8. For purposes of illustration, an example of a vibroseis cross-correlation technique will now be described by way of example with reference to FIGS. 9, 10A, 10B, and 11.

Figure 10A:
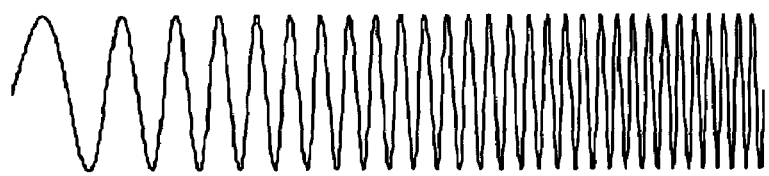
FIG. 10A shows an example of an unfiltered sweep signal, which may vary in frequency (e.g., 5 Hz to 50 Hz) over a given time period.
Figure 10B:
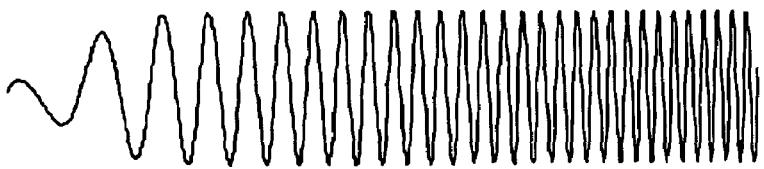
FIG. 10B shows an example of a simulated sweep signal after geophone filtration.

FIG. 10A shows an example of an unfiltered sweep signal, which may vary in frequency (e.g., 5 Hz to 50 Hz) over a given time period. As illustrated in FIG. 9, the unfiltered electronic sweep signal may be fed to vibrator 902 and cross-correlation unit 912. According to one implementation, the vibrator 902 uses the electronic sweep signal to produce corresponding seismic vibrations in the earth formation 904. These vibrations are detected by geophone 910, which produces a filtered output geophone response signal. FIG. 10B shows an example of a simulated sweep signal after geophone filtration. In the example of FIG. 10B, the signal is filtered by a 10 Hz geophone with 70% damping.

Figure 11:
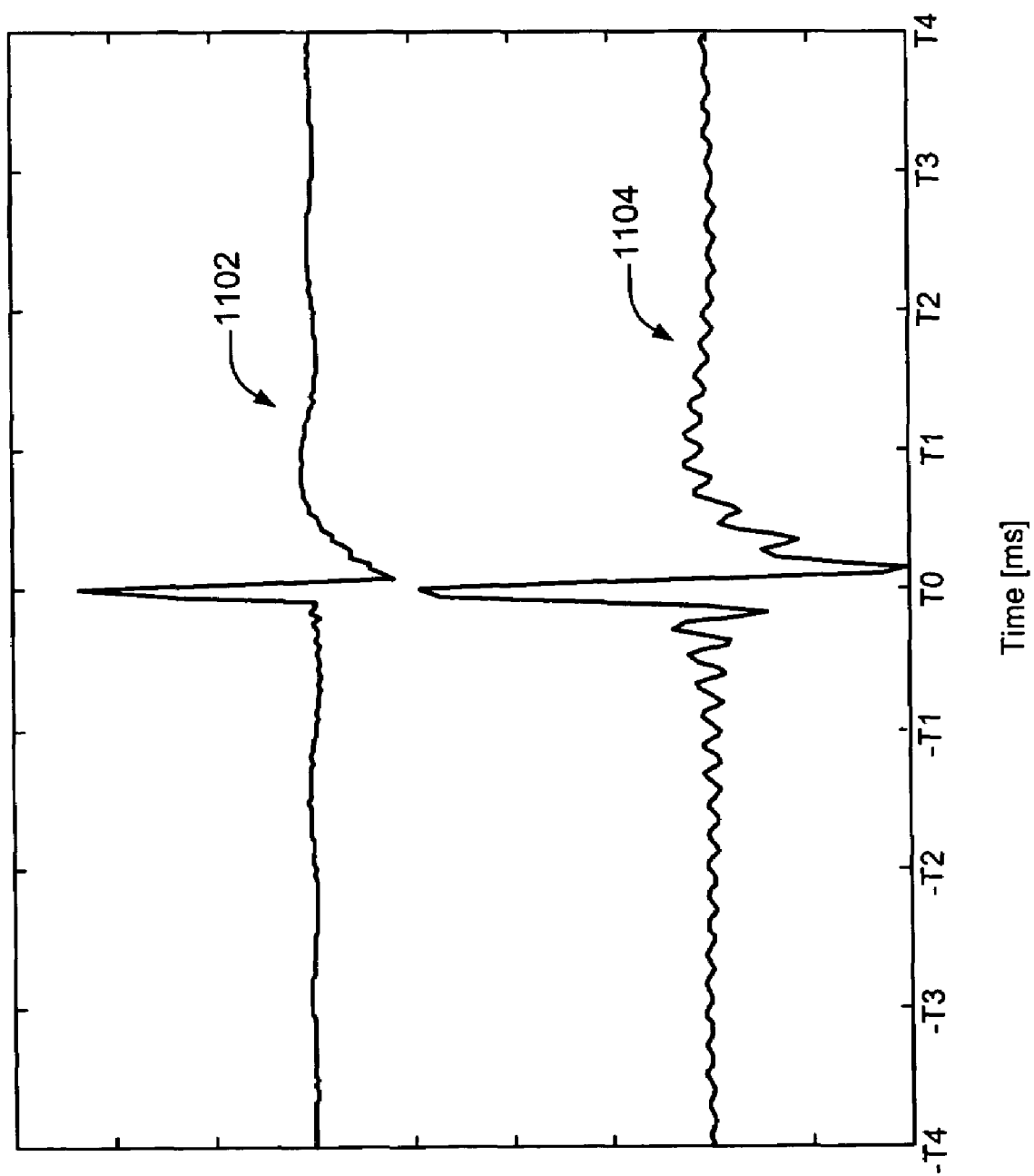
FIG. 11 graphically illustrates an example of the correlation between an unfiltered (original) sweep signal 1102 and a geophone filtered sweep signal 1104.

The cross-correlation unit 912 comparison the unfiltered pilot sweep signal with the geophone filtered sweep signal. FIG. 11 graphically illustrates an example of the correlation between the unfiltered (i.e., original or source) sweep signal 1102 and the geophone filtered sweep signal 1104. As illustrated in FIG. 11, the correlated results are no longer zero phase for various ranges of sweep signal frequencies, such as, for example, from 10 Hz to 100 Hz and from 5 Hz to 50 Hz.

Geophone Response Characteristics and Calibration

Geophone manufacturers typically supply geophones with nominal response properties at room temperature, and provide assurances that the response properties are within specified tolerance ranges. For example, a manufacturer may specify that the tolerance ranges at room temperature may be, for example, +/−5% for natural frequency, open circuit sensitivity, open circuit damping and DC resistance. However, tests performed by the present inventive entity have shown that 5% errors in the geophone response properties can result in amplitude measurement errors of 15% or more.

In order to process seismic signals with sufficient high fidelity to be able to extract precise information, it is preferable to calibrate the geophone prior to use, and to compensate for geophone response properties by adjusting, for example, data produced from the geophone response to take into account geophone calibration and/or response properties.

Traditionally, geophone calibration is accomplished by performing one or more tests on the geophone in order to determine the geophone's response properties, namely natural frequency, damping factor, sensitivity and DC resistance. Typically, the geophone's DC resistance (r) of the moving coil is measured using a multimeter. The natural frequency, damping factor, and sensitivity characteristics of the geophone may be measured using different measurement or testing techniques such as, for example, step calibration test techniques, impulse calibration test techniques, impedance calibration test techniques or dynamic calibration test techniques. The sensitivity characteristics of the geophone may also be measured using a reciprocity calibration test technique. Each of these different measurement techniques is described below.

Step Calibration Test Technique

Figure 3A:
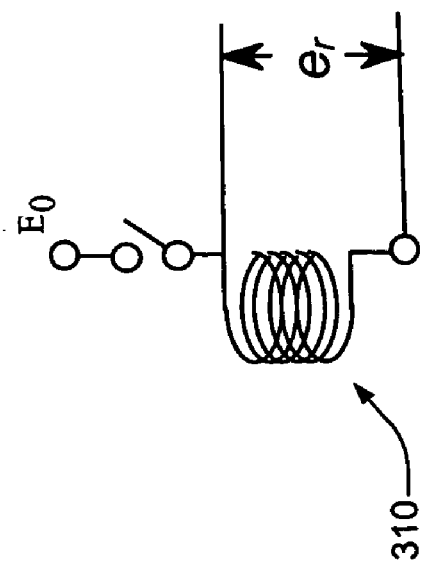
FIGS. 3A and 3B provide examples of a step calibration test technique for measuring geophone response properties.
Figure 3B:
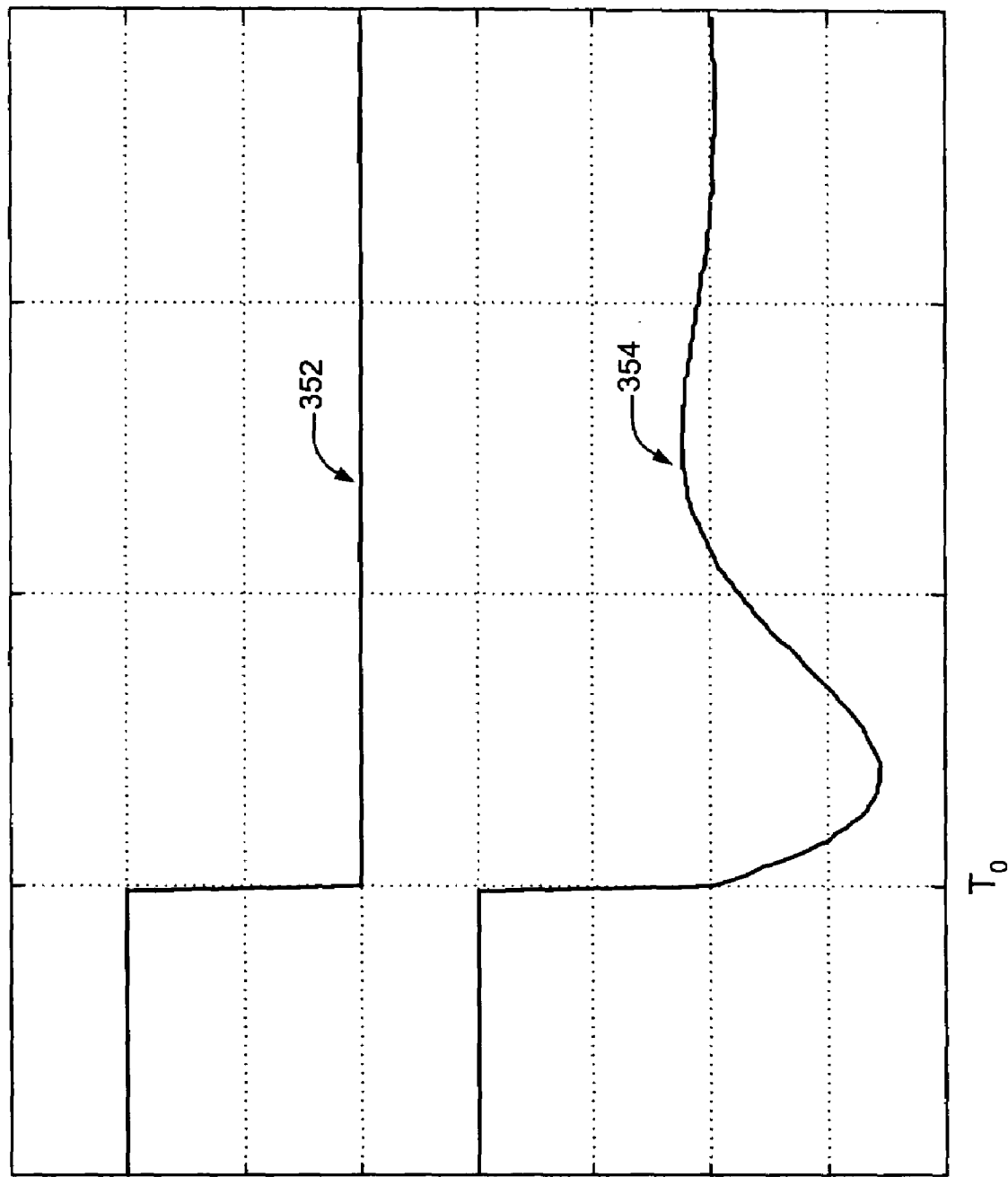

An example of a step calibration test technique for measuring geophone response properties may be illustrated with reference to FIGS. 3A and 3B. FIG. 3A shows a simplified schematic of a geophone 300. According to one embodiment of the step calibration test technique, a voltage may be applied at $E_0$ to dislocate the moving coil 310 from its neutral position. The voltage applied at $E_0$ is then released (e.g., at time $T_0$), and the geophone responds according to its natural vibration. The natural vibration is measured as the response signal from the output of the geophone. This is illustrated, for example, in FIG. 3B of the drawings, which graphically illustrates the step test input voltage 352 (at $E_0$) and the geophone output signal 354. Using the step test, sensitivity, natural frequency and damping factor characteristics of the geophone may be calculated based on a given set of initial parameters, including the value of $E_0$, the DC resistance of the moving coil, and the amount of moving mass of the geophone.

Impulse Calibration Test Technique

Figure 4A:
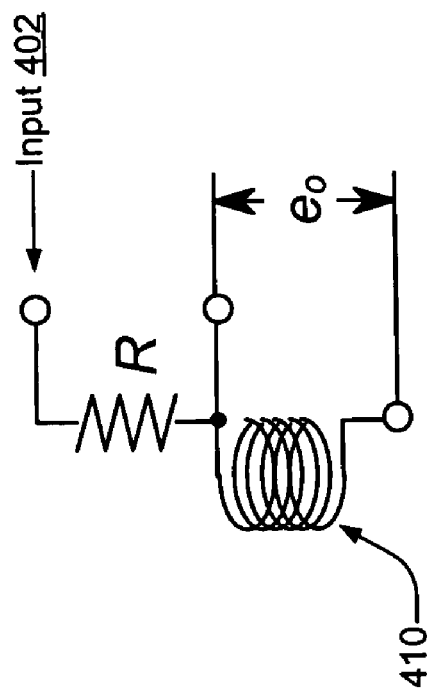

An example of an impulse calibration test technique for measuring geophone response properties may be illustrated with reference to FIGS. 4A and 4B. FIG. 4A shows a simplified schematic of a geophone 400. According to one embodiment of the impulse calibration test technique an impulse test signal is input to the geophone at 402. An example of the impulse test signal is represented by signal line 452 of FIG. 4B. Ranges for portions of the geophone response output signal 454 (e.g., a1, a2, T) are pre-calculated for sensitivity, damping and natural frequency based on stated tolerances of the geophone response properties. The impulse test signal may be applied at time $T_0$, and the geophone response for a1, a2 and T may then be measured to see if the geophone the response properties are within their stated tolerance ranges. Typically, the impulse calibration test technique is not used for calibrating the geophone, but rather is typically used to verify that the geophone response properties are within their stated tolerance ranges.

Impedance Calibration Test Technique

Figure 5:
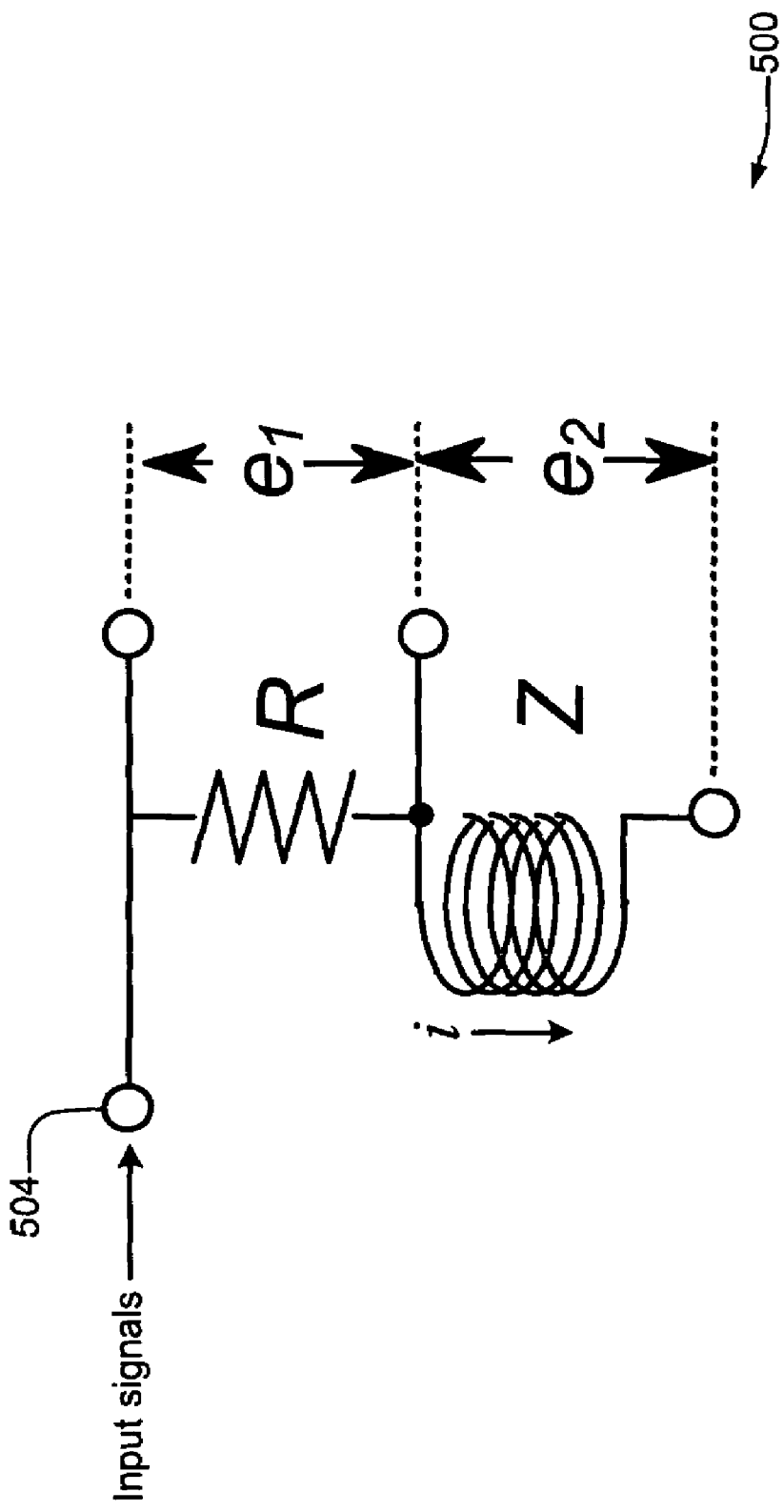
FIG. 5 provides an example of an impedance calibration test technique for measuring geophone response properties.

An example of an impedance calibration test technique for measuring geophone response properties may be illustrated with reference to FIG. 5 of the drawings. According to one embodiment of the impedance calibration test technique, input signal(s) (e.g., sinusoidal signals) are applied at 504 and output voltages $e_1$ and $e_2$ are measured as shown in FIG. 5. The impedance at the measurement frequency may be derived in accordance with the following equation:

$$Z = \frac{e_2}{i} = \frac{e_2 R}{e_1} \quad (7)$$

In Equation 7 above, the electric signal applied to the coil is represented by $e_2$. The current which flows into the coil may be determined by $e_1$ and R.

The impedance of a geophone may be expressed as:

$$Z(\omega) = r + \frac{S_g^2}{m} \frac{j\omega}{(\omega^2 - \omega_0^2) + 2jD_0\omega_0\omega} \quad (8)$$

Calculation of impedance utilizes at least two measurements at the frequencies $\omega_1$ and $\omega_2$.

The natural frequency ($\omega_0$), damping factor ($\zeta_0$) and sensitivity ($S_0$) may be calculated according to:

$$\omega_0 = \sqrt{\frac{(A \cdot \omega_1 - \omega_2)\omega_1\omega_2}{A \cdot \omega_2 - \omega_1}} \quad (9)$$

$$f_0 = \frac{1}{2\pi} \cdot \omega_0 \quad (10)$$

$$\zeta_0 = \frac{(\omega_0^2 - \omega_1^2)(\text{Re}(Z(\omega_1)) - R_c)}{2\omega_0\omega_1 \text{Im}(Z(\omega_1))} \quad (11)$$

$$S_g = \sqrt{\frac{m\text{Im}\{Z(\omega_1)\}\{(\omega_0^2 - \omega_1^2)^2 + 4\zeta_0^2\omega_0^2\omega_1^2\}}{(\omega_0^2 - \omega_1^2)\omega_1}} \quad (12)$$

where, $$A = \frac{\frac{\text{Re}(Z(\omega_1)) - r}{\text{Im}(Z(\omega_1))}}{\frac{\text{Re}(Z(\omega_2)) - r}{\text{Im}(Z(\omega_2))}} \quad (13)$$

and where:

$f_0$ corresponds to natural frequency [Hz],
$\zeta_0$ corresponds to open-circuit damping factor,
$S_g$ corresponds to open-circuit sensitivity derived from nominal moving mass [V/m/s],
$\omega_1$ corresponds to angular frequency of f1,
$\omega_2$ corresponds to angular frequency of f2,
Re(Z) corresponds to impedance real part,
Im(Z) corresponds to impedance imaginary part,
r corresponds to coil resistance [Ω],
m corresponds to geophone moving mass [kg].

It will be appreciated that calculation of the geophone response properties using the above-described impedance calibration test technique relies upon utilizing a known value for the amount of moving mass (m) of the geophone. Typically, this known value for m corresponds to the nominal value of the moving mass which is provided by the manufacturer.

Dynamic Calibration Test Technique

An example of a dynamic calibration test technique for measuring geophone response properties may be illustrated with reference to FIG. 6 of the drawings.

Figure 6:
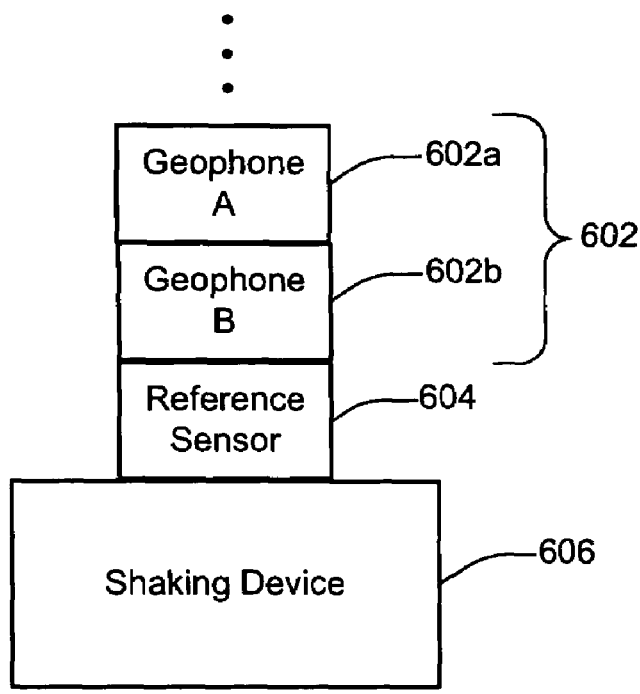
FIG. 6 provides an example of a dynamic calibration test technique for measuring geophone response properties.

According to one embodiment of the dynamic calibration test technique, a calibrated reference sensor 604 and one or more geophones 602 to be calibrated are positioned on top of a shaking device 606, as illustrated, for example, in FIG. 6. The geophone(s) 602 and reference sensor 604 are then shaken (e.g., in a vertical direction of excitation) using shaking device 606. The geophone response properties may then be determined by comparing the geophone response output to the reference sensor output. For example, since the phase and amplitude response are known from the reference sensor measurements, the natural frequency and damping factor of the subject geophone may be determined from the transfer function between the two.

It will be appreciated that the relative accuracy of the dynamic calibration test technique depends upon the accuracy of calibration of the reference sensor and the response of the reference sensor. Typically, the reference sensor 604 is calibrated by a third party which is associated with some type of entity for measurement standards.

The embodiment of FIG. 6 illustrates one implementation of the dynamic calibration test using a vertical configuration. According to an alternate implementation of the present invention, the dynamic calibration test may also be performed using a horizontal configuration. In such an embodiment, the geophone(s), reference sensor and shaker device assembly may be positioned horizontally, and excitation applied in a horizontal direction.

According to at least one embodiment, the geophone(s), reference sensor and shaker device may be enclosed in a housing which, for example, may be made with iron, steel, and/or materials which help to prevent magnetic coupling between the shaker and the geophones.

According to a specific implementation of the dynamic calibration test technique, the reference sensor 604 may correspond to a reference geophone in which the moving mass of the reference geophone has been substantially accurately measured and/or determined. Various techniques for accurately measuring a geophone's moving mass are described in greater detail below.

Reciprocity Calibration Test Technique

An example of a reciprocity calibration test technique for measuring geophone response properties may be illustrated with reference to FIGS. 7A and 7B.

According to one embodiment, the reciprocity calibration test technique may be used to determine the sensitivity of multiple geophones in situations where no reference sensor is used.

Figure 7A:
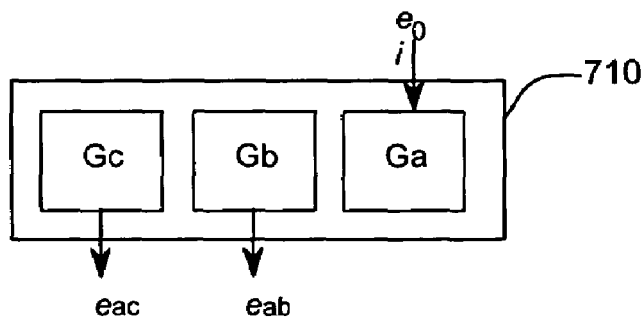
FIGS. 7A and 7B provide examples of a reciprocity calibration test technique for measuring geophone response properties.

For example, as shown in the embodiment of FIG. 7A, three uncalibrated geophones (Ga, Gb, Gc) are mounted on a block 710. A sinusoidal electric signal $e_0$ is then input into one of the geophones (Ga), which causes excitation of the geophone Ga in the direction indicated. This excitation results in the shaking of block 710, and consequently results in the shaking of geophones Gb and Gc.

In open circuit conditions, the responses output signals of geophones Gb and Gc (namely $e_{ab}$ and $e_{ac}$) may be expressed as a function of input signal voltage and geophone impedances as shown below:

$$e_{ab} = \frac{S_a e_0}{M_s \text{abs}\{Z_a(\omega)\}} \quad \frac{\omega}{\sqrt{(\omega_0^2 - \omega^2)^2 + (2D_a \omega_a \omega)^2}} \frac{S_b \omega^2}{\sqrt{(\omega_b^2 - \omega^2)^2 + (2D_b \omega_b \omega)^2}} \quad (14)$$

$$e_{ac} = \frac{S_a e_0}{M_s \text{abs}\{Z_a(\omega)\}} \frac{\omega}{\sqrt{(\omega_0^2 - \omega^2)^2 + (2D_a \omega_a \omega)^2}}$$

$$\frac{S_b \omega^2}{\sqrt{(\omega_c^2 - \omega^2)^2 + (2D_c \omega_c \omega)^2}}$$

where M is the mass of block with three geophones.

Figure 7B:
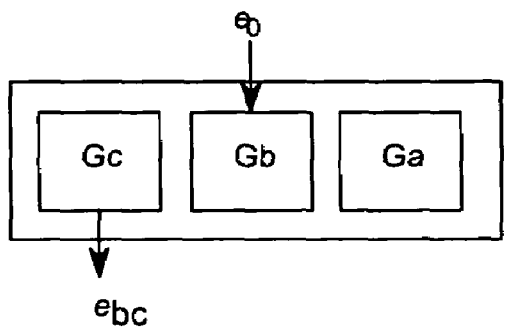

Another sinusoidal electric signal is then input into geophone Gb to thereby shake geophone Gc along with block 710 (as illustrated, for example, in FIG. 7B).

The response of geophone Gc ($e_{bc}$) may then be expressed by:

$$e_{bc} = \frac{S_b e_0}{M_s \text{abs}\{Z_a(\omega)\}} \quad (15)$$

$$\frac{\omega}{\sqrt{(\omega_b^2 - \omega^2)^2 + (2D_b \omega_b \omega)^2}} \frac{S_c \omega^2}{\sqrt{(\omega_c^2 - \omega^2)^2 + (2D_c \omega_c \omega)^2}}$$

The absolute sensitivities of three geophones may be determined by solving the equations below:

$$S_a = \sqrt{\frac{e_{ab} e_{ac}}{e_{bc} e_0} M_s \frac{\{Z_a(\omega)\}^2}{\{Z_b(\omega)\}} \frac{(\omega_a^2 - \omega^2)^2 + (2D_a \omega_a \omega)^2}{\omega^3}} \quad (16)$$

$$S_b = \sqrt{\frac{e_{ab} e_{bc}}{e_{ac} e_0} M_s \{Z_b(\omega)\} \frac{(\omega_b^2 - \omega^2)^2 + (2D_b \omega_b \omega)^2}{\omega^3}}$$

$$S_c = \sqrt{\frac{e_{ac} e_{bc}}{e_{ab} e_0} M_s \{Z_b(\omega)\} \frac{(\omega_c^2 - \omega^2)^2 + (2D_c \omega_c \omega)^2}{\omega^3}}$$

The embodiment of FIGS. 7A–7B illustrate one implementation of the reciprocity calibration test using a horizontal configuration. According to an alternate implementation of the present invention, the reciprocity calibration test may also be performed using a vertical configuration. In such an embodiment, the geophones may be positioned vertically, and excitation applied in a vertical direction.

Additional details relating to the reciprocity calibration test technique may be found in the reference "The Reciprocity Calibration of Piezoelectric Accelerometers," by Mark Harrison, A. O. Sykers, and Paul G. Marcotte, THE JOURNAL OF THE ACCOUSTICAL SOCIETY OF AMERICA, Volume 24, Number 4, July, 1952, herein incorporated by reference in its entirety for all purposes.

A detailed description of various embodiments of the reciprocity calibration test technique for geophone calibration is described in U.S. Pat. No. 5,644,067 to Gabrielson, entitled "APPARATUS AND METHOD FOR CALIBRATION OF SENSING TRANSDUCERS", the entirety of which is incorporated herein by reference for all purposes.

Other Factors Affecting Geophone Calibration

Research conducted by the present inventive entity has revealed that geophone response measurements are dependent not only upon its internal response properties, but also upon external factors such as, for example, temperature and tilt of the geophone. For example, the DC resistance (r) of the geophone is a function of temperature, and the geophone response is also a function of temperature. More specifically, by considering the electric circuit shown in FIG. 2, the geophone's sensitivity may be affected by the change in coil resistance r as shown by Equation 6 (above). The open circuit sensitivity may also be reduced by the temperature as shown, for example, in FIG. 7. Temperature also affects the open circuit damping characteristics. Geophone response may also be affected by its tilt. Additionally, if a geophone is used under tilt, the displacement of the internal springs may change the geophone's natural frequency.

Moving Mass Issues

In addition to the above-described factors which may affect geophone response measurements and/or response properties, it will be appreciated that many of the above-described geophone calibration and geophone response property test techniques are dependent upon utilizing known values for various geophone properties in order to determine values for unknown geophone properties. For example, as described previously, at least a portion of the above-described geophone calibration test techniques and geophone response property test techniques rely upon using a pre-known value for the amount of moving mass (m) of the geophone. As described previously with respect to FIG. 1, moving coils 12, 13, bobbin 14, and suspension springs 20, 22 collectively form the moving mass portion (m) of the geophone 10. Typically, the value for m corresponds to the nominal value of the moving mass which is provided by the manufacturer. One technique which may be used by manufacturers for determining the geophone moving mass value is to compute the moving mass value by adding together estimated or average mass values of the each of the individual components (e.g., moving coil, bobbin, suspension springs) which collectively form the moving mass.

Because geophone manufacturers typically provide values for nominal geophone response properties, and provide assurances that the response properties are within specified tolerance ranges, it is common practice in the industry, when performing geophone calibration tests, to rely upon the nominal value of the moving mass which is provided by the manufacturer. Moreover, precise calculation of the geophone moving mass value is extremely difficult to ascertain. One reason for this is that the moving mass is comprised of several different (and sensitive) components within the geophone which are typically inaccessible to the user. Another reason is that it is difficult to determine the precise portion of moving suspension spring mass which contributes to the geophone moving mass value.

Moreover, there has conventionally been no need or desire to perform independent measurements of geophone moving mass values since, conventionally, there has been no recognition in the industry of the possibility that errors in geophone moving mass values may significantly contribute to errors in geophone calibration and/or geophone response characteristics. As a result, there has been no motivation to one having ordinary skill in the relevant art to measure the geophone moving mass value to a degree of precision which is greater than that of the nominal value provided by the manufacturer.

Contrary to conventional wisdom, however, the present inventive entity has discovered that errors in the geophones nominal moving mass values, may, in fact, significantly contribute to errors in geophone calibration and/or geophone response characteristics. Accordingly, one technique for improving geophone calibration measurements and/or geophone response compensation techniques is to perform an accurate measurement of the geophone moving mass properties. According to at least one embodiment of the present invention, the amount of moving mass may be measured and used to determine and/or compensate for various geophone response characteristics. In one implementation, the measured amount of moving mass may be used to more accurately determine the geophone response properties (such as, for example, natural frequency, damping factor, sensitivity, etc.) using, for example, one or more of the geophone response property test techniques.

According to a specific embodiment of the present invention, one technique for improving geophone calibration measurements and/or geophone response compensation techniques is to determine the moving mass by measuring the mass of the moving coil, bobbin, and suspension springs before fabrication of a geophone, and stamp the determined moving mass value on the geophone. In this way, the actual moving mass value for each geophone may be ascertained and used for subsequent operations. This technique differs from conventional techniques which use the manufacturer's estimated or nominal value of the moving mass. Moreover, by using a more precise moving mass value, greater precision of the geophone response parameters may also be obtained, for example, using the impedance method described by Equations 9, 11, and 12.

According to an alternate embodiment of the present invention, another technique which may be used for determining the amount of moving mass of a geophone is to calculate the geophone's moving mass value using at least a portion of the geophone's response parameter values which have been determined using one or more of the above-described geophone response property test techniques. For example, according to one implementation, the moving mass value may be calculated using measured or calculated values for the geophone's damping factor, natural frequency, and open circuit sensitivity, as described in the equations below:

$$m_0 = \frac{S_g^2(\omega_0^2 - \omega_1^2)\omega_1}{\text{Im}(Z(\omega_1))[(\omega_0^2 - \omega_1^2)^2 + 4\zeta_0^2\omega_0^2\omega_1^2]} \quad (17a)$$

or $$m_0 = m\left(\frac{S_g}{S_0}\right)^2 \quad (17b)$$

where:
$m_0$ corresponds to absolute moving mass
$\zeta_0$ corresponds to open-circuit damping factor,
$S_0$ corresponds to open-circuit sensitivity,
$S_g$ corresponds to open-circuit sensitivity derived from nominal moving mass,
$\omega_1$ corresponds to angular frequency of a first measurement,
$\text{Im}(Z)$ corresponds to impedance imaginary part,
$\omega_0$ corresponds to natural frequency.

In one implementation, the geophone's open circuit sensitivity may be determined, for example, by measurement and/or by using the dynamic calibration test technique. The geophone's damping factor and natural frequency may be determined, for example, using the impedance calibration test technique. According to different embodiments, for measurements involving the dynamic calibration test technique, response parameter values for the reference sensor or reference geophone may be obtained using a variety of different techniques, such as, for example, by (1) fabricating a reference geophone by measuring the moving mass, (e.g., by weighing the moving coil and recording the moving mass value before fabrication of the reference sensor), (2) using a reference sensor which conforms with a public measurement standard such as, for example, The National Research Laboratory of Metrology of Japan (http://www.nrlm.gojp/english/), (3) using the reciprocity calibration test technique, etc.

According to at least one implementation, the moving mass value is a constant which does not change with varying temperature or tilt of the geophone. Thus, once the moving mass is known, a geophone can be tested in-situ any time using one or more of the above-described techniques. Additionally, it will be appreciated that the technique of the present invention allows for improved accuracy of geophone calibration, which may be performed in-situ or before field employment.

Geophone Response Compensation

It will be appreciated that the technique of the present invention may be used to more precisely quantify the geophone response parameters, such as, for example, sensitivity, damping, and/or natural frequency. For example, by using a more precise, calculated moving mass value, the impedance test may be used to more precisely quantify the geophone response parameters, such as, for example, open circuit sensitivity, open circuit damping, and/or natural frequency. Consequently, the improved accuracy of the geophone response parameters not only allows the geophone to be calibrated with greater precision, but also allows for greater accuracy of geophone response compensation techniques.

According to various embodiments of the present invention, a variety of different geophone response compensation techniques may be used to achieve greater accuracy of the geophone response characteristics and/or measurements. For example, in at least one implementation, geophone response parameters values (which, for example, may be determined during geophone calibration) are used to compensate and/or transform the geophone response output signal(s) in a manner which provides greater accuracy and/or better approximates ideal geophone response characteristics. According to different embodiments, such ideal geophone response characteristics may include, for example, geophone response signals which exhibit zero phase characteristics, geophone response signals which exhibit symmetry characteristics, etc.

According to a specific embodiment of the present invention, a transfer function may be used to transform geophone response output signal(s) in a manner which better approximates ideal geophone response characteristics. In one implementation, the transfer function may be derived using information relating to the geophone response parameter values. Since the transfer function of an ideal geophone response is also known (e.g., for a geophone with the following properties: natural frequency=10 Hz, open circuit sensitivity=30 V/m/s, open circuit damping=0.4, DC resistance=375 ohm, effective moving mass=10 gram), it is then possible to transfer or transform the geophone's response signals to the ideal geophone response. An example transformation may be implemented using the following equation:

$$Sig_n = iffl\left\{fft(Sig_m) * \frac{H(f_n, \zeta_n, S_n, DRC_n)}{H(f_m, \zeta_m, S_m, DRC_m)}\right\} \quad (18)$$

where:
H corresponds to transfer function of a geophone,
$f_n$ corresponds to nominal natural frequency (e.g., 10 Hz),
$\zeta_n$ corresponds to nominal damping factor (e.g., 0.7),
$S_n$ corresponds to nominal sensitivity,
$DCR_n$ corresponds to nominal DC resistance (DCR) at which nominal response parameters are specified,
$f_m$ corresponds to measured natural frequency in working environment,
$\zeta_m$ corresponds to measured damping factor in working environment,
$S_m$ corresponds to measured sensitivity in working environment,
$DCR_m$ corresponds to measured DCR at which a geophone measures seismic signals,
$Sig_n$ corresponds to compensated signal,
$Sig_m$ corresponds to measured signal in working condition.

According to different embodiments, the geophone response compensation technique of the present invention may be applied to individual geophones as well as an array of geophones. For example, in one implementation, the geophone response compensation technique of the present invention may be applied to an array of geophones using, for example, the moving mass value which represents the average moving mass value of the geophone array. Moreover, even in situations where it is determined that selected geophones are out of tolerance, the geophone response compensation technique of the present invention may be used to compensate the output data from the out of tolerance geophones in order to transform such data into a valid, usable data.

Geophone Response Compensation for Vibroseis

FIG. 11 graphically illustrates that vibroseis correlation with geophone output response signals is not zero phase. However, in accordance with at least one embodiment of the present invention, at least one geophone transfer function may be applied to the digitized pilot signal sweep in order to achieve geophone response compensation for vibroseis measurements. This is illustrated, for example, in FIGS. 12–15 of the drawings.

Figure 12:
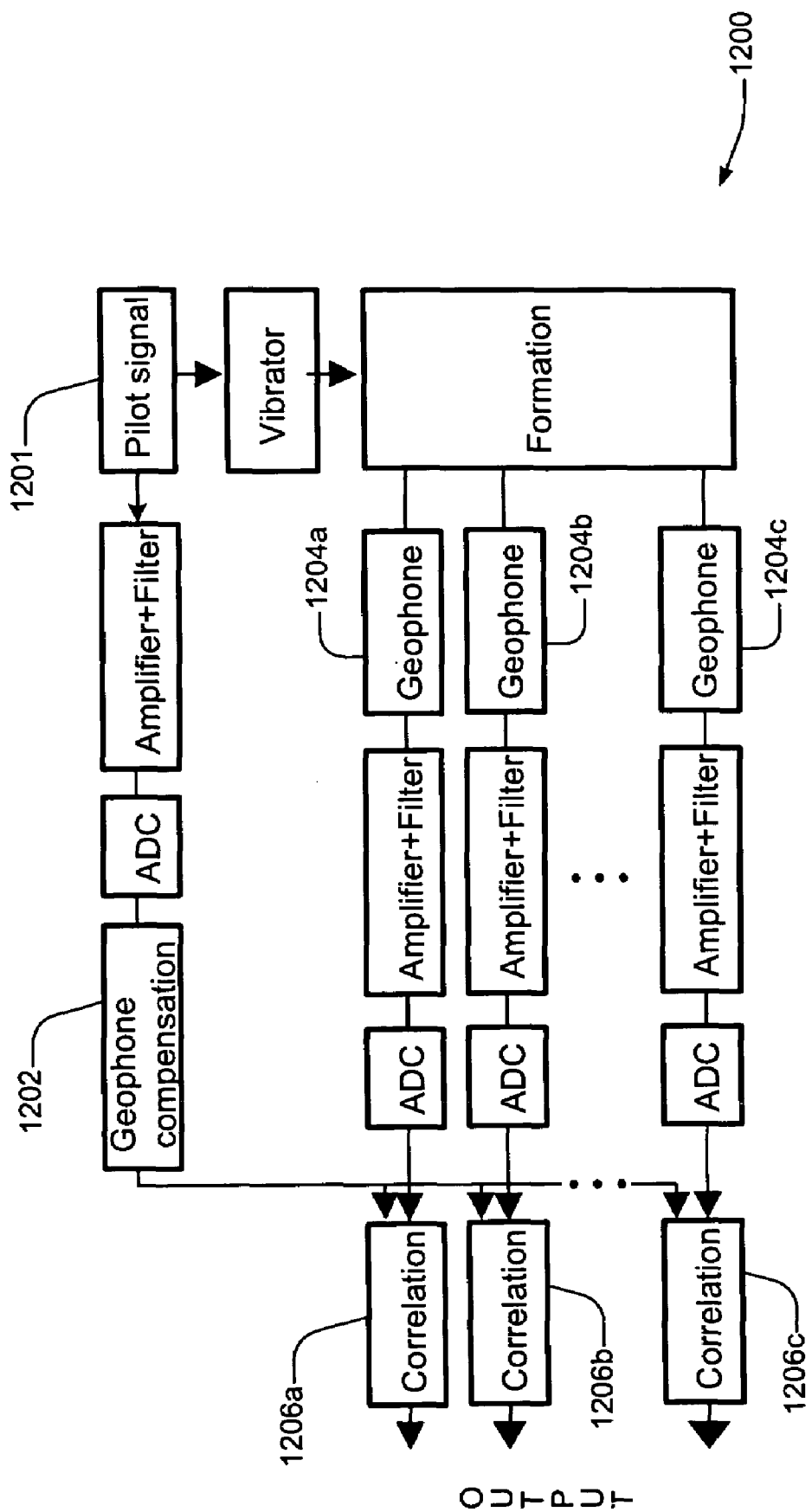
FIG. 12 shows a block diagram illustrating one embodiment of how the geophone response compensation technique of the present invention may be applied to an array of geophones which have been deployed for vibroseis prospecting operations.

FIG. 12 shows a block diagram illustrating one embodiment of how the geophone response compensation technique of the present invention may be applied to an array of geophones which have been deployed for vibroseis prospecting operations. In this example, it is assumed that an average or nominal geophone response transfer function is applied to the pilot signal to produce a modified pilot signal which may then be correlated with one or more geophone response output signals. In the example illustrated in FIG. 12, geophone compensation operations may be implemented at the geophone compensation block 1202 by applying, for example, the following equation:

$$Sig_n = iffl\{fft(Sig_m) * H(f_n, \zeta_n, S_n, DRC_n)\} \quad (19)$$

where:
H corresponds to transfer function of a geophone,
$f_n$ corresponds to nominal natural frequency (e.g., 10 Hz),
$\zeta_n$ corresponds to nominal damping factor (e.g., 0.7),
$S_n$ corresponds to nominal sensitivity,
$DCR_n$ corresponds to nominal DC resistance (DCR) at which nominal response parameters are specified,
$\zeta_m$ corresponds to measured damping factor in working environment,
$Sig_n$ corresponds to compensated signal,
$Sig_m$ corresponds to measured signal in working condition.

Figure 13:
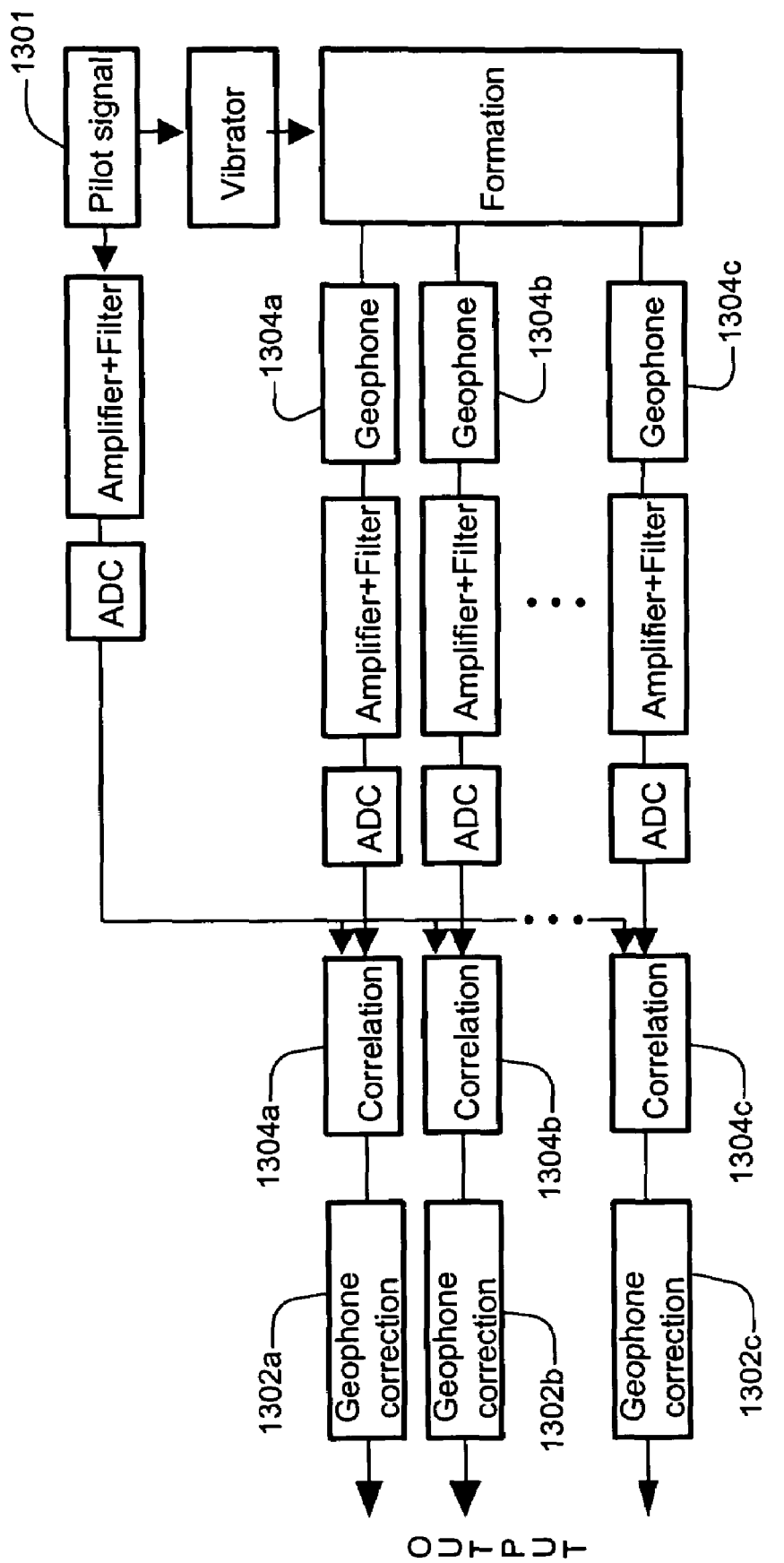
FIG. 13 shows a block diagram illustrating an alternate embodiment of how the geophone response compensation technique of the present invention may be applied to an array of geophones which have been deployed for vibroseis prospecting operations.

FIG. 13 shows a block diagram illustrating an alternate embodiment of how the geophone response compensation technique of the present invention may be applied to an array of geophones which have been deployed for vibroseis prospecting operations. According to a specific implementation, individual geophone response compensation functions may be applied to corresponding geophones in the array of geophones (e.g., 1304a–c). In the example illustrated in FIG. 13, the vibroseis pilot signal is correlated with geophone response output signals to thereby generate a plurality of correlated output signals. The correlated output signals may then be modified, for example, by implementing compensation or correction operations. According to one implementation, correction a respective correlated output signals may be implemented at each of the geophone correction blocks 1302a–c by applying, for example, Equation (18).

In each of the embodiments illustrated in FIGS. 12 and 13, it is also possible to apply compensation filters obtained from an in-situ test for all or selected geophone signals.

Figure 14:
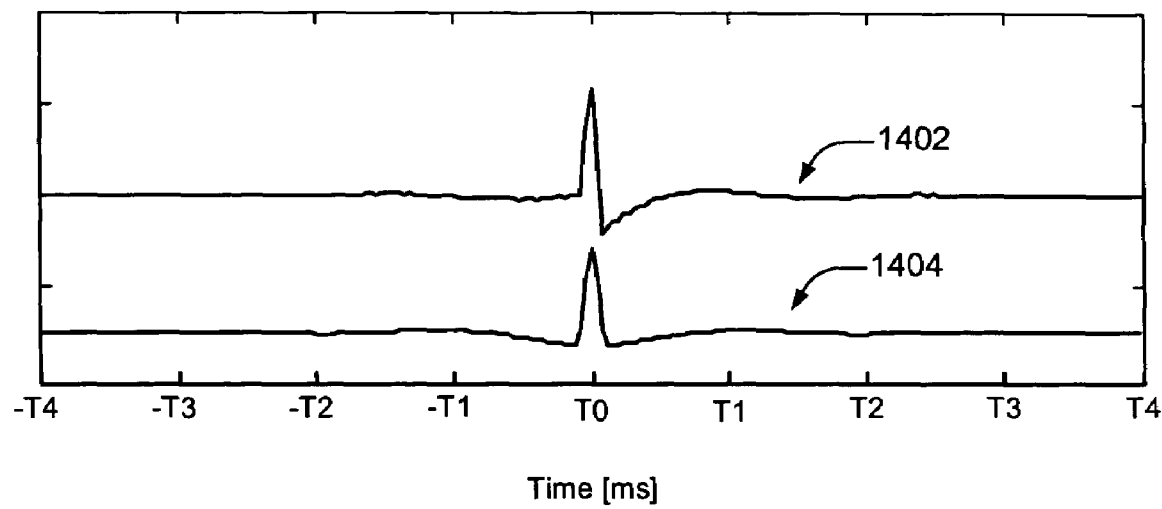
FIGS. 14 and 15 graphically illustrate differences between uncompensated geophone response signals and geophone response signals which have been compensated using the geophone response compensation technique of the present invention.
Figure 15:
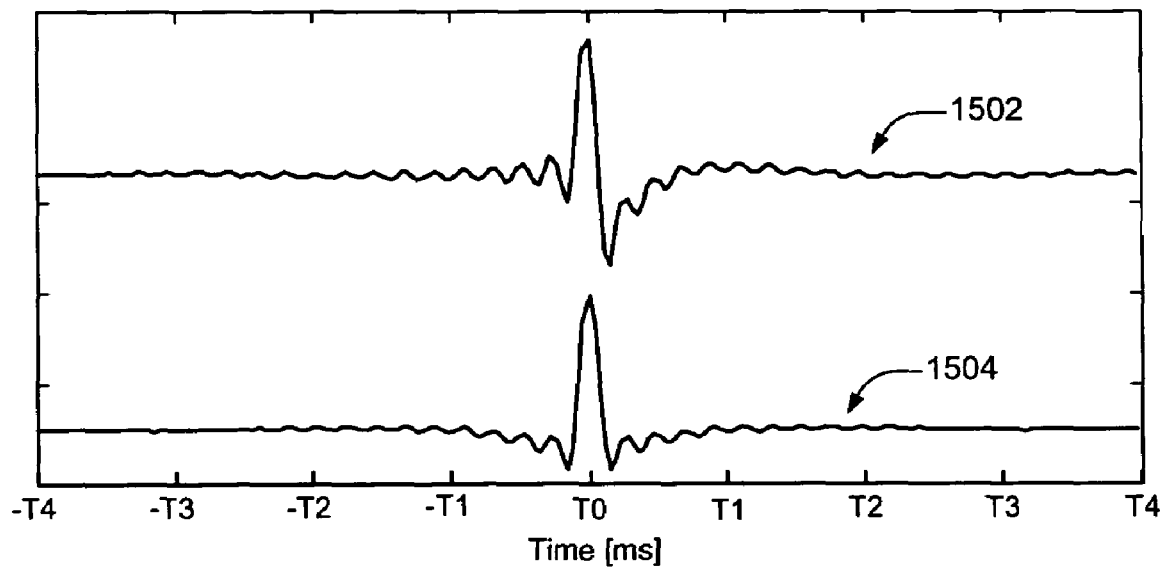

FIGS. 14 and 15 graphically illustrate differences between uncompensated geophone response signals and geophone response signals which have been compensated using the geophone response compensation technique of the present invention. In the example of FIG. 14, signal 1402 represents a correlated geophone response signal (corresponding to a pilot sweep frequency range of 10–100 Hz) for which geophone response compensation has not been performed. Signal 1404 represents a correlated geophone response signal (corresponding to a pilot sweep frequency range of 10–100 Hz) for which geophone response compensation has been performed. As illustrated in FIG. 14, signal 1404 better approximates ideal geophone response characteristics than signal 1402.

In the example of FIG. 15, signal 1502 represents a correlated geophone response signal (corresponding to a pilot sweep frequency range of 5–50 Hz) for which geophone response compensation has not been performed. Signal 1504 represents a correlated geophone response signal (corresponding to a pilot sweep frequency range of 5–50 Hz) for which geophone response compensation has been performed. As illustrated in FIG. 15, signal 1504 better approximates ideal geophone response characteristics than signal 1502.

It will be appreciated that the technique of the present invention may be used to minimize the phase of correlated geophone the response signals. Moreover, using the geophone response compensation technique of the present invention, true zero phase may be obtained for correlated geophone response signals.

Determining Geophone Response Parameters

The following section provides a more detailed discussion of various techniques which may be used for obtaining and curved accuracy in the measurement of geophone response parameters.

As described previously, the measured values of many geophone response parameters (such as, for example, natural frequency, damping factor, sensitivity, DC resistance, etc.) are dependent upon external factors such as, for example, temperature and tilt of the geophone. By measuring the DC resistance (DCR) at working conditions, it is possible to determine the actual or real-time temperature of a geophone. Once the real-time temperature of the geophone has been determined, the values of other response parameters (e.g., damping factor, sensitivity and natural frequency) of the geophone may then be accurately calculated for the actual working temperature of the geophone.

For example, for standard copper magnetic wire, the DCR may be expressed as a function of temperature as according to:

$$R_m = R_{25}\left(1 + \frac{C_T}{100} \cdot (T-25)\right) \quad (A0)$$

where $C_r = (0.393\%)/°$ C.

In the impedance calibration test technique for performing geophone calibration, the DCR is typically measured by a multimeter. The calibration test technique may then be used to calculate natural frequency, open circuit damping and sensitivity. However, the present inventive entity has determined that independent DCR measurement (obtained, for example, by multimeter testing) may result in the calculation of multiple possible values for damping factor and sensitivity. Accordingly, in at least one embodiment, the DCR value may be calculated or measured using the impedance calibration test technique. The discussion below briefly describes how four geophone response parameters are calibrated by injecting signals at two different frequencies. More specifically, according to a specific embodiment, values for four unknown geophone response parameters, namely, DCR (r), natural frequency ($\omega_0$), damping factor ($\zeta_0$), and sensitivity ($S_0$) may be determined by solving four impedance equations derived from two impedance measurements using two different frequencies $\omega_1$ and $\omega_2$.

Figure 16:
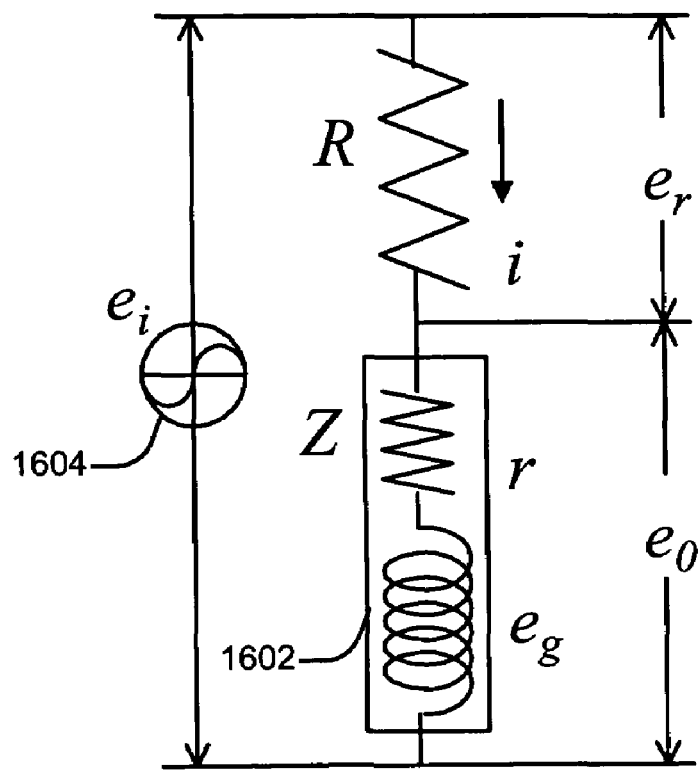
FIG. 16 shows a schematic diagram 1600 which may be used for describing a specific embodiment of the impedance calibration test technique.

FIG. 16 shows a schematic diagram 1600 which may be used for describing a specific embodiment of the impedance calibration test technique. As illustrated in FIG. 16, current (i) flows into the moving coil portion 1602 which is suspended in a magnetic flux B (not shown). The force F acting on the moving coil may be expressed as F=Bli, where B is the magnetic flux density, l is the effective wire length of the moving coil in the magnetic flux B, and i is the current.

The equation of motion for the moving coil may be expressed as:

$$m\frac{d^2\xi}{dt^2} + \mu\frac{d\xi}{dt} + k\xi = Bli \quad (A1)$$

where $\xi$ is the relative position of the moving coil inside the geophone. The first term in the left hand side of Equation (A1) represents the inertial force, the second term represents the frictional force proportional to the velocity, and the last term represents the spring force. The summation of these three forces balances to the force due to the electric current.

The moving coil generates an electric signal $e_g$ proportional to the velocity of the motion relative to the magnetic field, which may be expressed as:

$$e_g = Bl\frac{d\xi}{dt} \quad (A2)$$

Equation (A1) may be rewritten in terms of $e_g$ as:

$$\frac{d^2 e_g}{dt^2} + 2\zeta_0\omega_0\frac{de_g}{dt} + \omega_0^2 e_g = -\frac{S_0^2}{m}\frac{di}{dt} \quad (A3)$$

where:

$$\omega_0 = \sqrt{\frac{k}{m}}$$

$$\zeta = \frac{\mu}{2m\omega_0}$$

$$S_0 = Bl$$

Since the geophone output signal may be expressed as:

$$e_0 = e_g + ri \quad (A4)$$

Equation (A3) may be rewritten in terms of the geophone output signal as:

$$\frac{d^2 e_0}{dt^2} + 2\zeta_0\omega_0\frac{de_0}{dt} + \omega_0^2 e_0 = -r\left(\frac{d^2 i}{dt^2} + 2\zeta_0\omega_0\frac{di}{dt} + \omega_0^2 i\right) - \frac{S_0^2}{m}\frac{di}{dt} \quad (A5)$$

Laplace transformation of Equation (A5) yields geophone impedance as:

$$Z(s) = -\frac{E_0(s)}{I(s)} = r + \frac{S_0^2}{m}\frac{s}{s^2 + 2\zeta_0\omega_0 s + \omega_0^2} \quad (A6)$$

Equation (A6) may be rewritten as:

$$Z(j\omega) = r + \frac{S_0}{m\omega_0}\frac{j\left(\frac{\omega}{\omega_0}\right)}{\left\{1 - \left(\frac{\omega}{\omega_0}\right)^2\right\} + 2j\zeta_0\left(\frac{\omega}{\omega_0}\right)} \quad (A7)$$

Real and imaginary parts of impedance may be calculated according to:

$$\text{Re}(Z) = r + \frac{S_0}{m\omega_0}\frac{2\zeta_0\left(\frac{\omega}{\omega_0}\right)^2}{\left\{1 - \left(\frac{\omega}{\omega_0}\right)^2\right\} + \left(2\zeta_0\frac{\omega}{\omega_0}\right)^2} \quad (A8)$$

$$\text{Im}(Z) = r + \frac{S_0}{m\omega_0}\frac{1 - \left(\frac{\omega}{\omega_0}\right)^2}{\left\{1 - \left(\frac{\omega}{\omega_0}\right)^2\right\} + \left(2\zeta_0\frac{\omega}{\omega_0}\right)^2} \quad (A9)$$

Figure 17:
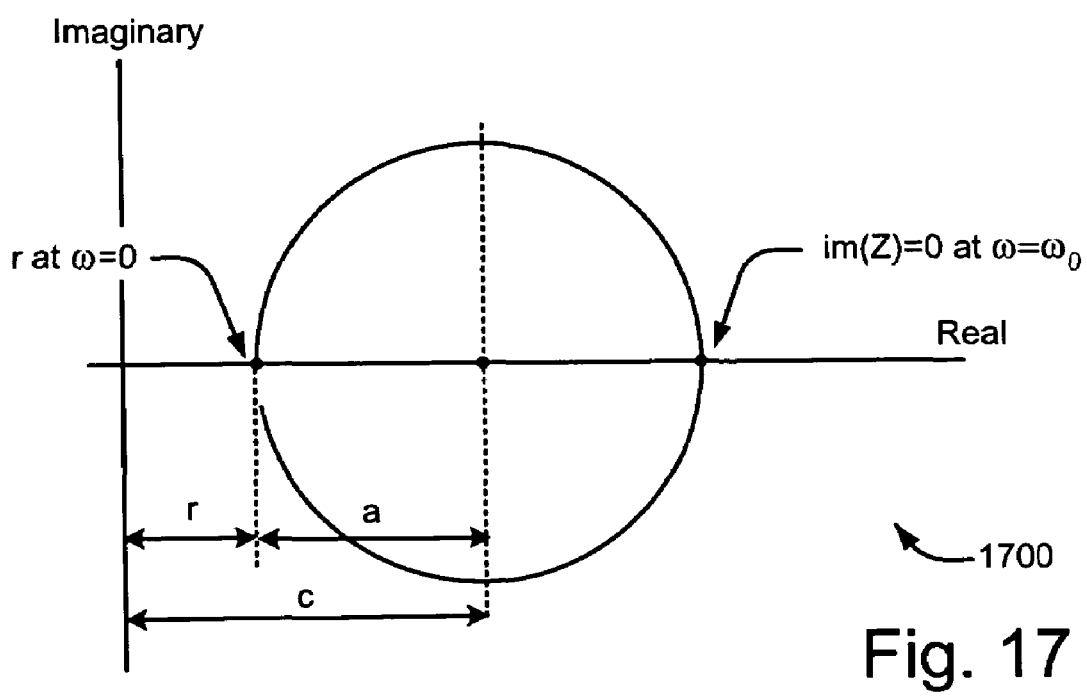
FIG. 17 illustrates the real and imaginary parts of an impedance equation, as represented as a circle on a complex plane.

The real and imaginary parts of the impedance equation may be represented as a circle on a complex plane, as shown, for example, in FIG. 17 of the drawings.

The square sum of Equations (A8) and (A9) yields an expression:

$$\left\{\text{Re}(Z) - r - \frac{S_0^2}{4\zeta_0\omega_0 m}\right\}^2 + \{\text{Im}(Z)\}^2 = \left(\frac{S_0^2}{4\zeta_0\omega_0 m}\right)^2 \quad (A10)$$

Equation (A10) may be represented by the circle in FIG. 17 with radius a defined as:

$$a^2 = \{Re(Z) - c\}^2 + \{Im(Z)\}^2 \quad (A11)$$

The center c of the circle is given by:

$$c = r + \frac{S_0^2}{4\zeta_0 \omega_0 m} \quad (A12)$$

Computation for geophone parameters may be expressed by:

$$Z = -\frac{e_0}{i} = R\frac{e_0}{e_R} \quad (A13)$$

Measurement of impedance at two frequencies, $\omega_1$ and $\omega_2$, gives four equations for real and imaginary parts of two impedances, as illustrated, for example, by Equations (A14)–(A17):

$$Re(Z_1) = r + \frac{S_0^2}{m\omega_0} \frac{2\zeta_0 \left(\frac{\omega_1}{\omega_0}\right)^2}{\left\{1 - \left(\frac{\omega_1}{\omega_0}\right)^2\right\}^2 + \left(2\zeta_0 \frac{\omega_1}{\omega_0}\right)^2} \quad (A14)$$

$$Re(Z_2) = r + \frac{S_0^2}{m\omega_0} \frac{2\zeta_0 \left(\frac{\omega_2}{\omega_0}\right)^2}{\left\{1 - \left(\frac{\omega_2}{\omega_0}\right)^2\right\}^2 + \left(2\zeta_0 \frac{\omega_2}{\omega_0}\right)^2} \quad (A15)$$

$$Im(Z_1) = \frac{S_0^2}{m\omega_0} \frac{\left\{1 - \left(\frac{\omega_1}{\omega_0}\right)^2\right\}\left(\frac{\omega_1}{\omega_0}\right)}{\left\{1 - \left(\frac{\omega_1}{\omega_0}\right)^2\right\}^2 + \left(2\zeta_0 \frac{\omega_1}{\omega_0}\right)^2} \quad (A16)$$

$$Im(Z_2) = \frac{S_0^2}{m\omega_0} \frac{\left\{1 - \left(\frac{\omega_2}{\omega_0}\right)^2\right\}\left(\frac{\omega_2}{\omega_0}\right)}{\left\{1 - \left(\frac{\omega_2}{\omega_0}\right)^2\right\}^2 + \left(2\zeta_0 \frac{\omega_2}{\omega_0}\right)^2} \quad (A17)$$

From these four equations, it is possible to derive four geophone parameters, r, $\zeta_0$, $\omega_0$, and $S_0$.

Inserting $Z_1$ and $Z_2$ into Equation (A11) gives the center and radius of the impedance circle.

$$c = \frac{Im(Z_1)^2 - Im(Z_2)^2 + Re(Z_1)^2 - Re(Z_2)^2}{2\{Re(Z_1) - Re(Z_2)\}} \quad (A18)$$

$$a = \sqrt{Im(Z_1)^2 + \{c - Re(Z_1)\}^2} \quad (A19)$$

The DC resistance r may then be calculated according to:

$$r = c - a \quad (A20)$$

From the four impedance Equations (A14)–(A17), $\zeta_0$, $\omega_0$, and $S_0$ may be determined according to:

$$\omega_0 = \sqrt{\frac{(A\omega_1 - \omega_2)\omega_1 \omega_2}{(A\omega_2 - \omega_1)}} \quad (A21)$$

where:

-continued $$A = \frac{Re(Z_1) - r}{Re(Z_2) - r} \cdot \frac{Im(Z_1)}{Im(Z_2)} \quad (A22)$$

$$\zeta_0 = \frac{(\omega_0^2 - \omega_1^2)\{Re(Z_1) - r\}}{2\omega_0 \omega_{1q}\{Im(Z_1) - r\}} \quad (A23)$$

$$S_0 = \sqrt{\frac{mIm(Z_1)\{(\omega_0^2 - \omega_1^2)\}^2 + 4\zeta_0^2 \omega_0^2 \omega_1^2}{(\omega_0^2 - \omega_1^2)\omega_1}} \quad (A24)$$

It should be noted that $\zeta_0$ and $S_0$ may also be found as:

$$\zeta_0 = \frac{(\omega_0^2 - \omega_2^2)\{Re(Z_2) - r\}}{2\omega_0 \omega_2\{Im(Z_2) - r\}} \quad (A25)$$

$$S_0 = \sqrt{\frac{mIm(Z_2)\{(\omega_0^2 - \omega_2^2)\}^2 + 4\zeta_0^2 \omega_0^2 \omega_2^2}{(\omega_0^2 - \omega_2^2)\omega_2}} \quad (A26)$$

The values for $\zeta_0$, and $S_0$ calculated from Equations (A13) and (A24) agree with the amounts calculated from Equations (A25) and (A26) as long as r is calculated from Equations (A18), (A19), and (A20). However, if r is measured by using a separate instrument, such as a multimeter, for example, then the values for $\zeta_0$, and $S_0$ may not agree.

Other Embodiments

Generally, the geophone calibration and compensation techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the geophone calibration and compensation techniques of this invention may be implemented on a general-purpose programmable machine selectively activated or reconfigured by a computer program stored in memory. Such programmable machine may be implemented on a general-purpose network host machine such as a personal computer or workstation. Further, the invention may be at least partially implemented on a card (e.g., an interface card) for a network device or a general-purpose computing device.

Figure 18:
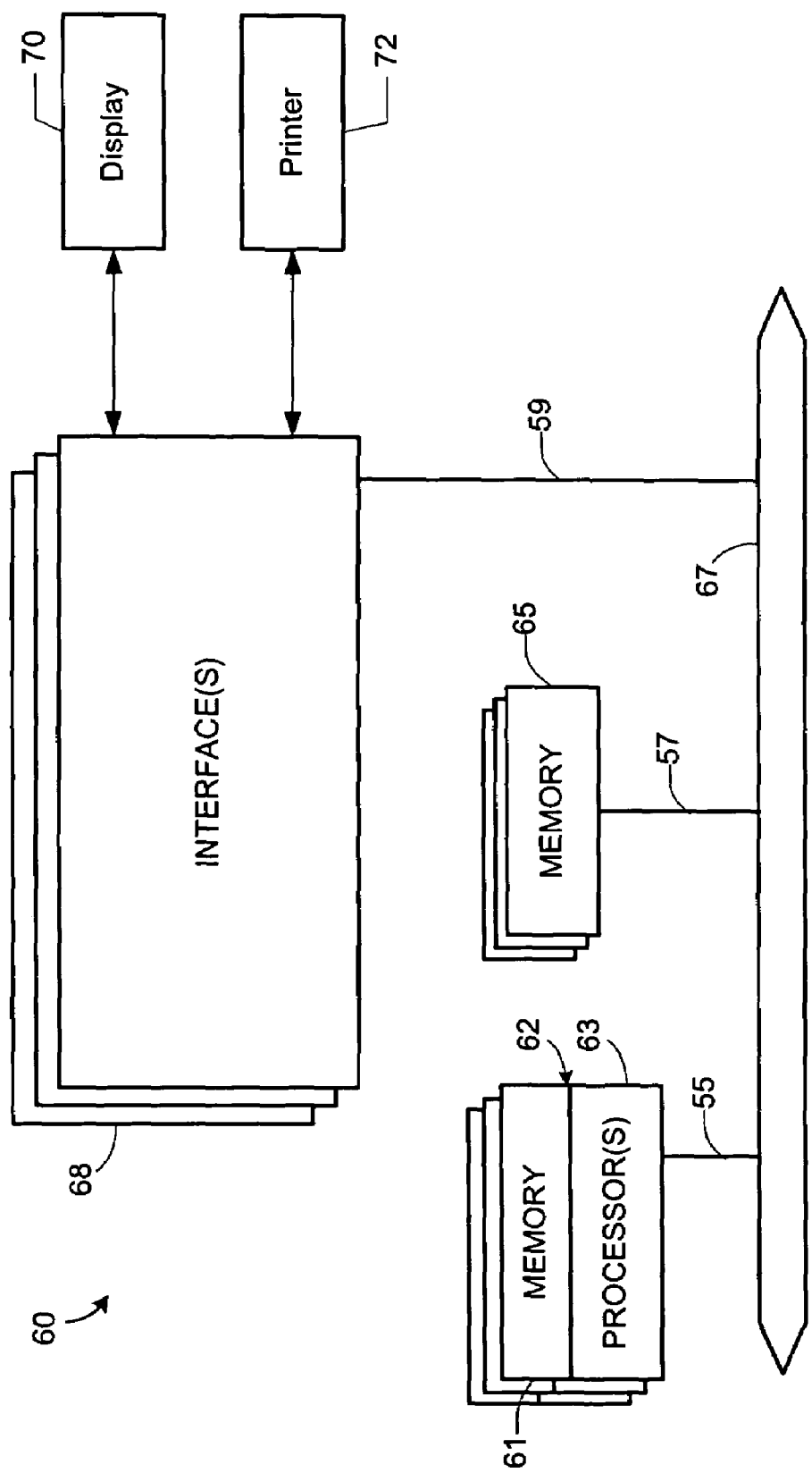
FIG. 18 illustrates a network device 60 suitable for implementing various aspects of the geophone calibration and compensation techniques of the present invention.

Referring now to FIG. 18, a network device 60 suitable for implementing various aspects of the geophone calibration and compensation techniques of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a general-purpose computing device, the CPU 62 may be responsible for data processing, media management, I/O communication, calculating the geophone response parameter values, performing geophone response compensation operations, etc. The CPU 62 preferably accomplishes all these functions under the control of software including an operating system (e.g. Windows NT), and any appropriate applications software.

CPU 62 may include one or more processors 63 such as a processor from the Motorola or Intel family of microprocessors, or the MIPS family of microprocessors. In an alternative embodiment, processor 63 is specially designed hardware for controlling the operations of network device 60. In a specific embodiment, a memory 61 (such as nonvolatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60, such as, for example, display devices 70 and/or printing devices 72. It will be appreciated that the various geophone calibration and compensation techniques of the present invention may generate data or other information to be presented for display on electronic display devices and/or non-electronic display devices (such as, for example, printed for display on paper).

Examples of other types of interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may be used, for example, to handle data processing tasks, display tasks, communication tasks, media control tasks, etc.

Although the system shown in FIG. 18 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the geophone calibration and compensation techniques described herein. The program instructions may control the operation of an operating system and/or one or more applications, for example. The memory or memories may also be configured to store data structures, seismic logging information, geophone response parameter information, vibroseis prospecting information, and/or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A method for calculating response parameters of a geophone configured or designed for use in seismic exploration activities to compensate seismic data for geophone response, the method comprising:
   performing at least one calibration test on a geophone to determine values for at least a portion of first response parameters associated with the geophone;
   determining, using the first response parameters, a moving mass parameter value for the geophone; and
   wherein the moving mass parameter value represents an amount of moving mass associated with the geophone.

2. The method of claim 1 wherein the first response parameters includes at least one response parameter selected from a group consisting of: open circuit sensitivity, damping factor and natural frequency.

3. The method of claim 1 wherein the first response parameters includes open circuit sensitivity, damping factor and natural frequency.

4. The method of claim 1 wherein the moving mass of the geophone includes:
   at least one moving coil;
   a bobbin; and
   at least one suspension spring.

5. The method of claim 1 further comprising performing at least one of an impedance calibration test, an impulse calibration test, and a step calibration test on the geophone to determine values for at least one of the first response parameters.

6. The method of claim 1 further comprising performing a dynamic calibration test on the geophone to determine values for at least one of the first response parameters.

7. The method of claim 1 further comprising performing a reciprocity calibration test on the geophone to determine values for at least one of the first response parameters.

8. The method of claim 1 further comprising calculating the moving mass parameter ($m_0$) value according to:

$$m = \frac{S_g^2(\omega_0^2 - \omega_1^2)\omega_1}{\text{Im}(Z(\omega_1))[(\omega_0^2 - \omega_1^2)^2 + 4\zeta_0^2\omega_0^2\omega_1^2]};$$

where:
$m_0$ corresponds to absolute moving mass
$\zeta_0$ corresponds to open-circuit damping factor,
$S_0$ corresponds to open-circuit sensitivity,
$S_g$ corresponds to open-circuit sensitivity derived from nominal moving mass,
$\omega_1$ corresponds to angular frequency of a first measurement, Im(Z) corresponds to impedance imaginary part, and
ω₀ corresponds to natural frequency.

9. The method of claim 1 further comprising calculating the moving mass parameter ($m_0$) value according to:

$$m_0 = m\left(\frac{S_g}{S_0}\right)^2$$

where:
$m_0$ corresponds to absolute moving mass
m corresponds to nominal moving mass
$S_0$ corresponds to open-circuit sensitivity, and
$S_g$ corresponds to open-circuit sensitivity derived from nominal moving mass.

10. The method of claim 1 further comprising:
determining an open circuit sensitivity value for the geophone;
determining a damping factor value for the geophone;
determining a natural frequency value for the geophone; and
calculating the moving mass parameter value using the open circuit sensitivity value, damping factor value and natural frequency value.

11. A method for calculating response parameters of a geophone configured or designed for use in seismic exploration activities to compensate seismic data for geophone response, the method comprising:
measuring a DC resistance value of the geophone at working conditions;
determining, using the measured DC resistance value, a current temperature value of the geophone; and
calculating at least a portion of the geophone response parameters using the current temperature value.

12. The method of claim 11 further comprising:
calculating an open circuit sensitivity value for the geophone using the current temperature value;
calculating a damping factor value for the geophone using the current temperature value;
calculating a natural frequency value for the geophone using the current temperature value; and
compensating for geophone response using the calculated geophone response parameters.

13. The method of claim 1 further comprising:
determining a transfer function based upon information relating to at least a portion of second response parameters, wherein the second response parameters includes at least one response parameter selected from a group consisting of: open circuit sensitivity, damping factor and natural frequency; and
modifying geophone response output information using the transfer function.

14. The method of claim 13 wherein:
at least one of the second response parameters is determined at working conditions.

15. The method of claim 13 further comprising using the moving mass parameter value to adjust values relating to the second response parameters.

16. The method of claim 13 further comprising using the moving mass parameter value to modify the geophone response output information.

17. The method of claim 13 further comprising calculating the moving mass parameter value using open circuit sensitivity, damping factor and natural frequency.

18. The method of claim 13 wherein the moving mass parameter value corresponds to a moving mass value according to:

$$m_0 = m\left(\frac{S_0}{S_g}\right)^2$$

where:
$m_0$ corresponds to absolute moving mass
m corresponds to nominal moving mass
$S_0$ corresponds to open-circuit sensitivity, and
$S_g$ corresponds to open-circuit sensitivity derived from nominal moving mass.

19. The method of claim 13 further comprising modifying a geophone response output signal according to:

$$Sig_n = ifft\left\{fft(Sig_m) * \frac{H(f_n, \zeta_n, S_n, DRC_n)}{H(f_m, \zeta_m, S_m, DRC_m)}\right\}$$

where:
H corresponds to transfer function of a geophone,
$f_n$ corresponds to nominal natural frequency,
$\zeta_n$ corresponds to nominal damping factor,
$S_n$ corresponds to nominal sensitivity,
$DRC_n$ corresponds to nominal DC resistance at which nominal response parameters are specified,
$f_m$ corresponds to measured natural frequency in working environment,
$\zeta_m$ corresponds to measured damping factor in working environment,
$S_m$ corresponds to measured sensitivity in working environment,
$DCR_m$ corresponds to measured DC resistance,
$Sig_n$ corresponds to compensated signal,
$Sig_m$ corresponds to measured signal in working condition.

20. The method of claim 13 further comprising:
determining that the geophone is out of tolerance, wherein geophone response output information generated by the geophone is invalid as being significantly inaccurate;
modifying the geophone response output information to produce modified geophone response output information which is valid as being significantly accurate.

21. A method for calculating response parameters of a geophone configured or designed for use in seismic exploration activities to compensate seismic data for geophone response, the method comprising:
measuring a DC resistance value of a geophone at working conditions;
determining, using the measured DC resistance value, a current temperature value of the geophone;
calculating at least a portion of geophone response parameters using the current temperature value;
determining a transfer function based upon information relating to at least one of the response parameters, wherein the response parameters include at least one response parameter selected from a group consisting of: open circuit sensitivity, damping factor and natural frequency; and
modifying geophone response output information using the transfer function.

22. The method of claim 21 further comprising:
calculating an open circuit sensitivity value for the first geophone using the current temperature value;
calculating a damping factor value for the first geophone using the current temperature value;
calculating a natural frequency value for the first geophone using the current temperature value; and
determining the transfer function based upon the calculated values for open circuit sensitivity, damping factor and natural frequency.

23. The method of claim 1 wherein geophone response output information is generated by at least one geophone during vibroseis prospecting operations, the method further comprising modifying the geophone response output information using geophone calibration information generated during calibration testing of the at least one geophone.

24. A system for calculating response parameters of a geophone configured or designed for use in seismic exploration activities to compensate seismic data for geophone response, the system comprising:
at least one processor;
at least one interface; and
memory;
the system being configured or designed to perform at least one calibration test on a geophone to determine values for at least a portion of first response parameters associated with the geophone;
the system being further configured or designed to determine, using the first response parameters, a moving mass parameter value for the geophone;
wherein the moving mass parameter value represents an amount of moving mass associated with the geophone.

25. The system of claim 24 wherein the first response parameters include at least one response parameter selected from a group consisting of: open circuit sensitivity, damping factor and natural frequency.

26. The system of claim 24 wherein the first response parameters include open circuit sensitivity, damping factor and natural frequency.

27. The system of claim 24 wherein the moving mass of the geophone includes:
at least one moving coil;
a bobbin; and
at least one suspension spring.

28. The system of claim 24 being further configured or designed to perform at least one of an impedance calibration test, an impulse calibration test, and a step calibration test on the geophone to determine values for at least one of the first response parameters.

29. The system of claim 24 being further configured or designed to perform a dynamic calibration test on the geophone to determine values for at least one of the first response parameters.

30. The system of claim 24 being further configured or designed to perform a reciprocity calibration test on the geophone to determine values for at least one of the first response parameters.

31. The system of claim 24 being further configured or designed to calculate the moving mass parameter ($m_o$) value according to:

$$S_g^2(\omega_0^2 - \omega_1^2)\omega_1$$

$$m_o = \frac{S_o^2(\omega_0^2 - \omega_1^2)\omega_1}{\text{Im}(Z(\omega_1))[(\omega_0^2 - \omega_1^2)^2 + 4\zeta_0^2\omega_0^2\omega_1^2]};$$

where:
$m_0$ corresponds to absolute moving mass
$\zeta_0$ corresponds to open-circuit damping factor,
$S_0$ corresponds to open-circuit sensitivity,
$S_g$ corresponds to open-circuit sensitivity derived from nominal moving mass,
$\omega_1$ corresponds to angular frequency of a first measurement,
Im(Z) corresponds to impedance imaginary part, and
$\omega_0$ corresponds to natural frequency.

32. The system of claim 24 being further configured or designed to calculate the moving mass parameter ($m_o$) value according to:

$$m_0 = m\left(\frac{S_g}{S_0}\right)^2$$

where:
$m_0$ corresponds to absolute moving mass
m corresponds to nominal moving mass
$S_0$ corresponds to open-circuit sensitivity, and
$S_g$ corresponds to open-circuit sensitivity derived from nominal moving mass.

33. The system of claim 24 being further configured or designed to:
determine an open circuit sensitivity value for the geophone;
determine a damping factor value for the geophone;
determine a natural frequency value for the geophone; and
calculate the moving mass parameter value using the open circuit sensitivity value, damping factor value and natural frequency value.

34. A system for calculating response parameters of a geophone configured or designed for use in seismic exploration activities to compensate seismic data for geophone response, the system comprising:
at least one processor;
at least one interface; and
memory;
the system being configured or designed to measure a DC resistance value of the geophone at working conditions;
determine, using the measured DC resistance value, a current temperature value of the geophone; and
calculate at least a portion of the geophone response parameters using the current temperature value.

35. The system of claim 34 being further configured or designed to:
calculate an open circuit sensitivity value for the geophone using the current temperature value;
calculate a damping factor value for the geophone using the current temperature value;
calculate a natural frequency value for the geophone using the current temperature value; and
compensate for geophone response using the calculated geophone response parameters.

36. The system of claim 24 being further configured or designed to:
determine a transfer function based upon information relating to at least a portion of second response parameters, wherein the second response parameters includes at least one response parameter selected from a group consisting of: open circuit sensitivity, damping factor and natural frequency; and modify geophone response output information using the transfer function.

37. The system of claim 36 wherein:

at least one of the second response parameters is determined at working conditions.

38. The system of claim 36 being further configured or designed to use the moving mass parameter value to adjust values relating to the second response parameters.

39. The system of claim 36 being further configured or designed to use the moving mass parameter value to modify the geophone response output information.

40. The system of claim 36 being further configured or designed to calculate the moving mass parameter value using open circuit sensitivity, damping factor and natural frequency.

41. The system of claim 36 wherein the moving mass parameter value corresponds to a moving mass value according to:

$$m_0 = m\left(\frac{S_0}{S_g}\right)^2$$

where:

$m_0$ corresponds to absolute moving mass m corresponds to nominal moving mass $S_0$ corresponds to open-circuit sensitivity, and $S_g$ corresponds to open-circuit sensitivity derived from nominal moving mass.

42. The system of claim 36 being further configured or designed to modify a geophone response output signal according to:

$$Sig_n = ifft\left\{fft(Sig_m) * \frac{H(f_n, \zeta_n, S_n, DRC_n)}{H(f_m, \zeta_m, S_m, DRC_m)}\right\}$$

where:

H corresponds to transfer function of a geophone, $f_n$ corresponds to nominal natural frequency, $\zeta_n$ corresponds to nominal damping factor, $S_n$ corresponds to nominal sensitivity, $DCR_n$ corresponds to nominal DC resistance at which nominal response parameters are specified, $f_m$ corresponds to measured natural frequency in working environment, $\zeta_m$ corresponds to measured damping factor in working environment, $S_m$ corresponds to measured sensitivity in working environment, $DCR_m$ corresponds to measured DC resistance, $Sig_n$ corresponds to compensated signal, $Sig_m$ corresponds to measured signal in working condition.

43. The system of claim 36 being further configured or designed to:

determine that the geophone is out of tolerance, wherein geophone response output information generated by the geophone is invalid as being significantly inaccurate;

modify the geophone response output information to produce modified geophone response output information which is valid as being significantly accurate.

44. A system for calculating response parameters of a geophone configured or designed for use in seismic exploration activities to compensate seismic data for geophone response, the system comprising:

at least one processor;

at least one interface; and memory;

the system being configured or designed to measure a DC resistance value of a geophone at working conditions;

determine, using the measured DC resistance value, a current temperature value of the geophone;

calculate at least a portion of geophone response parameters using the current temperature value;

determine a transfer function based upon information relating to at least one of the response parameters, wherein the response parameters include at least one response parameter selected from a group consisting of: open circuit sensitivity, damping factor and natural frequency; and modify geophone response output information using the transfer function.

45. The system of claim 44 being further configured or designed to:

calculate an open circuit sensitivity value for the first geophone using the current temperature value;

calculate a damping factor value for the first geophone using the current temperature value;

calculate a natural frequency value for the first geophone using the current temperature value; and determine the transfer function based upon the calculated values for open circuit sensitivity, damping factor and natural frequency.

46. The system of claim 24 wherein geophone response output information is generated by at least one geophone during vibroseis prospecting operations, the system being further configured or designed to modify the geophone response output information using geophone calibration information generated during calibration testing of the at least one geophone.

47. A system for calculating response parameters of a geophone configured or designed for use in seismic exploration activities to compensate seismic data for geophone response, the system comprising:

means for performing at least one calibration test on a geophone to determine values for at least a portion of first response parameters associated with the geophone; and means for determining, using the first response parameters, a moving mass parameter value for the geophone;

wherein the moving mass parameter value represents an amount of moving mass associated with the geophone.

48. The system of claim 47 wherein the first response parameters includes at least one response parameter selected from a group consisting of: open circuit sensitivity, damping factor and natural frequency.

49. The system of claim 47 wherein the first response parameters includes open circuit sensitivity, damping factor and natural frequency.

50. The system of claim 47 wherein the moving mass of the geophone includes:

at least one moving coil;

a bobbin; and at least one suspension spring.

51. The system of claim 47 further comprising means for performing at least one of an impedance calibration test, an impulse calibration test, and a step calibration test on the geophone to determine values for at least one of the first response parameters.

52. The system of claim 47 further comprising means for performing a dynamic calibration test on the geophone to determine values for at least one of the first response parameters.

53. The system of claim 47 further comprising means for performing a reciprocity calibration test on the geophone to determine values for at least one of the first response parameters.

54. The system of claim 47 further comprising means for calculating the moving mass parameter ($m_0$) value according to:

$$m_o = \frac{S_o^2(\omega_0^2 - \omega_1^2)\omega_1}{\text{Im}(Z(\omega_1))[(\omega_0^2 - \omega_1^2)^2 + 4\zeta_0^2\omega_0^2\omega_1^2]};$$

where:
$m_0$ corresponds to absolute moving mass
$\zeta_0$ corresponds to open-circuit damping factor,
$S_0$ corresponds to open-circuit sensitivity,
$S_g$ corresponds to open-circuit sensitivity derived from nominal moving mass,
$\omega_0$ corresponds to angular frequency of a first measurement,
Im(Z) corresponds to impedance imaginary part, and
$\omega_0$ corresponds to natural frequency.

55. The system of claim 47 further comprising means for calculating the moving mass parameter ($m_0$) value according to:

$$m_0 = m\left(\frac{S_g}{S_0}\right)^2$$

where:
$m_0$ corresponds to absolute moving mass
m corresponds to nominal moving mass
$S_0$ corresponds to open-circuit sensitivity, and
$S_g$ corresponds to open-circuit sensitivity derived from nominal moving mass.

56. The system of claim 47 further comprising:
means for determining an open circuit sensitivity value for the geophone;
means for determining a damping factor value for the geophone;
means for determining a natural frequency value for the geophone; and
calculating the moving mass parameter value using the open circuit sensitivity value, damping factor value and natural frequency value.

57. A system for calculating response parameters of a geophone configured or designed for use in seismic exploration activities to compensate seismic data for geophone response, the system comprising:
means for measuring a DC resistance value of the geophone at working conditions;
means for determining, using the measured DC resistance value, a current temperature value of the geophone; and means for calculating at least a portion of the geophone response parameters using the current temperature value.

58. The system of claim 57 further comprising:
means for calculating an open circuit sensitivity value for the geophone using the current temperature value;
means for calculating a damping factor value for the geophone using the current temperature value;
means for calculating a natural frequency value for the geophone using the current temperature value; and
means for compensating for geophone response using the calculated geophone response parameters.

59. The system of claim 47 further comprising:
means for determining a transfer function based upon information relating to at least a portion of second response parameters, wherein the second response parameters includes at least one response parameter selected from a group consisting of: open circuit sensitivity, damping factor and natural frequency; and
means for modifying geophone response output information using the transfer function.

60. The system of claim 59 wherein:
at least one of the second response parameters is determined at working conditions.

61. The system of claim 59 further comprising means for using the moving mass parameter value to adjust values relating to the second response parameters.

62. The system of claim 59 further comprising means for using the moving mass parameter value to modify the geophone response output information.

63. The system of claim 59 further comprising means for calculating the moving mass parameter value using open circuit sensitivity, damping factor and natural frequency.

64. The system of claim 59 wherein the moving mass parameter value corresponds to a moving mass value according to:

$$m_0 = m\left(\frac{So}{Sg}\right)^2$$

where:
$m_0$ corresponds to absolute moving mass
m corresponds to nominal moving mass
$S_0$ corresponds to open-circuit sensitivity, and
$S_g$ corresponds to open-circuit sensitivity derived from nominal moving mass.

65. The system of claim 59 further comprising means for modifying a geophone response output signal according to:

$$Sig_n = ifft\left\{fft(Sig_m) * \frac{H(f_n, \zeta_n, S_n, DRC_n)}{H(f_m, \zeta_m, S_m, DRC_m)}\right\}$$

where:
H corresponds to transfer function of a geophone,
$f_n$ corresponds to nominal natural frequency,
$\zeta_n$ corresponds to nominal damping factor,
$S_n$ corresponds to nominal sensitivity,
$DRC_n$ corresponds to nominal DC resistance at which nominal response parameters are specified,
$f_m$ corresponds to measured natural frequency in working environment,
$\zeta_m$ corresponds to measured damping factor in working environment, $S_m$ corresponds to measured sensitivity in working environment, $DCR_m$ corresponds to measured DC resistance, $Sig_n$ corresponds to compensated signal, $Sig_m$ corresponds to measured signal in working condition.

66. The system of claim 59 further comprising:

means for determining that the geophone is out of tolerance, wherein geophone response output information generated by the geophone is invalid as being significantly inaccurate;

means for modifying the geophone response output information to produce modified geophone response output information which is valid as being significantly accurate.

67. A system for calculating response parameters of a geophone configured or designed for use in seismic exploration activities to compensate seismic data for geophone response, the system comprising:

means for measuring a DC resistance value of a geophone at working conditions;

means for determining, using the measured DC resistance value, a current temperature value of the geophone;

means for calculating at least a portion of geophone response parameters using the current temperature value;

means for determining a transfer function based upon information relating to at least one of the response parameters, wherein the response parameters include at least one response parameter selected from a group consisting of: open circuit sensitivity, damping factor and natural frequency; and means for modifying geophone response output information using the transfer function.

68. The system of claim 67 further comprising:

means for calculating an open circuit sensitivity value for the first geophone using the current temperature value;

means for calculating a damping factor value for the first geophone using the current temperature value;

means for calculating a natural frequency value for the first geophone using the current temperature value; and means for determining the transfer function based upon the calculated values for open circuit sensitivity, damping factor and natural frequency.

69. The system of claim 47 wherein geophone response output information is generated by at least one geophone during vibroseis prospecting operations, the system further comprising means for modifying the geophone response output information using geophone calibration information generated during calibration testing of the at least one geophone.

* * * * *